(12) United States Patent
Manthiram et al.

(10) Patent No.: US 7,498,286 B2
(45) Date of Patent: Mar. 3, 2009

(54) ELECTROCATALYST FOR OXYGEN REDUCTION REACTION IN PROTON EXCHANGE MEMBRANE FUEL CELLS

(75) Inventors: Arumugam Manthiram, Austin, TX (US); Raghuveer Vadari, Austin, TX (US); Allen J. Bard, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 337 days.

(21) Appl. No.: 11/274,391

(22) Filed: Nov. 14, 2005

(65) Prior Publication Data

US 2006/0264322 A1 Nov. 23, 2006

Related U.S. Application Data

(63) Continuation-in-part of application No. 11/243,007, filed on Oct. 4, 2005.

(60) Provisional application No. 60/683,932, filed on May 23, 2005.

(51) Int. Cl.
H01M 4/88 (2006.01)
H01M 4/00 (2006.01)
H01M 8/00 (2006.01)
B01J 21/18 (2006.01)
B01J 23/40 (2006.01)
B01J 23/74 (2006.01)
C22C 5/00 (2006.01)
C22C 5/04 (2006.01)

(52) U.S. Cl. .................. 502/101; 502/185; 420/463; 420/464; 420/465; 420/466; 429/12; 429/27; 429/40; 429/41; 429/42; 429/43; 429/44; 148/430

(58) Field of Classification Search .................. 502/101, 502/185; 420/463–466; 429/12, 27, 30, 429/40–44; 148/430
See application file for complete search history.

(56) References Cited

U.S. PATENT DOCUMENTS

| | | | | |
|---|---|---|---|---|
| 4,639,303 | A * | 1/1987 | Staab et al. | 204/258 |
| 5,051,156 | A | 9/1991 | Scharifker et al. | |
| 5,759,944 | A * | 6/1998 | Buchanan et al. | 502/185 |
| 6,855,452 | B1 * | 2/2005 | Cooper et al. | 429/41 |
| 7,125,822 | B2 * | 10/2006 | Nakano et al. | 502/339 |
| 7,288,336 | B2 * | 10/2007 | Fukuda et al. | 429/44 |
| 2002/0068213 | A1 | 6/2002 | Kaiser et al. | |
| 2006/0099482 | A1* | 5/2006 | Scott et al. | 429/40 |

OTHER PUBLICATIONS

International Search Report and Written Opinion of the International Searching Authority for PCT/US2006/019886, dated Jun. 29, 2007.
Balbuena, P. B., et al., "Adsorption of O, OH, and H2O on Pt-Based Bimetallic Clusters Alloyed with Co, Cr, and Ni," J. Phys. Chem. A (2004), 108:6378-6384.
Fernandez, J. L., et al., "Scanning electrochemical microscopy 50. Kinetic study of electrode reactions by the tip generation-substrate collection mode." Anal. Chem. (2004), 76:2281-2289.
Mano, N., et al., "Oxygen Is Electroreduced to Water on a "Wired" Enzyme Electrode at a Lesser Overpotential than on Platinum," J. Am. Chem. Soc. (2003), 125:15290-15291.
Noronha, F. B., et al., "Evidence of Alloy Formation during the Activation of Graphite-Supported Palladium-Cobalt Catalysts," J. Catal. (1999), 186:20-30.
Paulus, U. A., et al., "Oxygen Reduction on Carbon-Supported Pt-Ni and Pt-Co Alloy Catalysts," J. Phys. Chem. B (2002), 106 :4181-4191.
Paulus, U. A., et al., "Oxygen reduction on high surface area Pt-based alloy catalysts in comparison to well defined smooth bulk alloy electrodes," Electrochim. Acta (2002), 47:3787-3798.
Sawai, K., et al., "Heat-Treated Transition Metal Hexacyanometallates as Electrocatalysts for Oxygen Reduction Insensitive to Methanol," J. Electrochem. Soc. (2004), 151:A682-688.
Strasser, P., et al., "High Throughput Experimental and Theoretical Predictive Screening of Materials—A Comparative Study of Search Strategies for New Fuel Cell Anode Catalysts," J. Phys. Chem. B (2003), 107:11013-11021.
Wang, C.; et al., "Proton Exchange Membrane Fuel Cells with Carbon Nanotube Based Electrodes," Nano Lett. (2004), 4:345-348.
Xiong, L., et al., "Pt-M (M=Fe, Co, Ni and Cu) electrocatalysts synthesized by an aqueous route for proton exchange membrane fuel cells," Electrochem. Commun. (2002), 4:898-903.
Xu, Y., "Adsorption and Dissociation of O2 on Pt-Co and Pt-Fe Alloys," J. Am. Chem. Soc. (2004), 126:4717-4725.
Zhang, J., et al., "Platinum Monolayer Electrocatalysts for O2 Reduction: Pt Monolayer on Pd(111) and on Carbon-Supported Pd Nanoparticles," J. Phys. Chem. B (2004), 108:10955-10964.

* cited by examiner

*Primary Examiner*—J. A. Lorengo
*Assistant Examiner*—Patricia L Hailey
(74) *Attorney, Agent, or Firm*—Edwin S. Flores; Daniel J. Chalker; Chalker Flores, LLP

(57) ABSTRACT

The present invention includes an apparatus, system and method for screening and making one or more electrocatalysts, electrocatalyst arrays, electrodes and catalysts for an oxygen reduction reaction with a Group VIII noble metal in contact with a component-M o form a Group VIII noble metal-M alloy, wherein component-M is one or more metals selected from Groups IIIA, IVA, VIII, IB, IIB, VB, VIB, VIIB and VIIIB of the Periodic Table.

6 Claims, 20 Drawing Sheets

ELECTROCATALYST FOR OXYGEN REDUCTION REACTION IN PROTON EXCHANGE MEMBRANE FUEL CELLS

CROSS-REFERENCE TO RELATED APPLICATIONS

This application is a continuation-in-part and claims priority based on U.S. patent application Ser. No. 11/243,007, filed Oct. 4, 2005, which claims priority to U.S. Provisional Application Ser. No. 60/683,932, filed May 23, 2005, the contents of which are incorporated by reference herein in their entireties.

The U.S. Government may own certain rights to this invention under National Science Foundation Grant No. 0109587. Without limiting the scope of the invention, its background is described in connection with electrode electrocatalytic activities for a system, method and apparatus, as an example.

TECHNICAL FIELD OF THE INVENTION

The present invention relates generally to electrochemical fuel cells, and in particular, to electrocatalytic activities for an improved electrode structure for use in proton exchange membrane fuel cells.

BACKGROUND OF THE INVENTION

Generally, a fuel cell is similar to other electrochemical cells in that there is an electrolyte (e.g., liquid or solid) and two electrodes (e.g., a cathode and an anode) at which the electrochemical reaction occurs. However, the fuel cell is distinguished from a conventional battery by its fuel storage capacity and in that its electrodes are catalytically active. A fuel cell is used to convert the stored energy of a fuel (e.g., hydrogen gas or methanol) into electrical energy.

The electrochemical reactions of the fuel cell required for the conversion includes oxidation of the fuel (e.g., hydrogen or methanol) at the anode and reduction of oxygen at the cathode. As the fuel is oxidized at the anode electrons are given up to an external electrical load and the oxidant (oxygen) accepts electrons and is reduced at the cathode. Ionic current through an electrolyte completes the circuit.

As a result of the nature of these reactions it is necessary for the electrodes to be designed to allow gaseous reactants and/or products to diffuse into and/or out of the electrode structures. The electrodes are specifically designed to be porous to allow gas diffusion and maximize the contact between the reactants and the electrode to optimize the reaction rate. One type of electrode commonly used is a membrane electrode assembly (hereafter referred to as "MEA") which is typically made of an ionically conducting polymeric membrane sandwiched between two electronically conducting electrodes.

The electrolyte is required to be in contact with both electrodes and is either acidic or alkaline and takes the form of a solid or a liquid depending on the particular application. For example, in a proton-exchange membrane fuel cell, the electrolyte is a solid proton-conducting polymer membrane, (e.g., perfluorosulphonic acid materials). Generally, the electrolyte must remain hydrated during operation in order to prevent loss of ionic conduction through the electrolyte. As a result of the necessity for hydration, the limits of the operating temperature of the PEMFC are between 70° C. and 120° C.

The relatively low operating temperatures of fuel cells require the use of electrocatalysts in order for the oxygen reduction and hydrogen oxidation reactions to proceed at useful rates. Noble metals, in particular platinum, have been found to be the most efficient and stable electrocatalysts for hydrogen oxidation in low-temperature fuel cells. Generally, the noble metal electrocatalyst is provided as small particles of high surface area, which are often, but not always, distributed on and supported by larger macroscopic conducting carbon particles to provide a desired catalyst loading. Conducting carbons are the preferred materials to support the catalyst. However, while supported platinum catalysts have demonstrated high activity for hydrogen oxidation, this proclivity for facile kinetics is severely retarded with carbon monoxide concentrations of only a few ppm.

Many fuel cell systems use reformed fuels, which are formed through a process whereby a hydrogen fuel is produced by converting a hydrocarbon-based fuel such as methane, or an oxygenated hydrocarbon fuel such as methanol, to hydrogen. In addition to hydrogen, the reformate fuel contains high levels of carbon dioxide (e.g., about 25%) and impurities, such as carbon monoxide (about 1%). In contrast, direct or non-reformed fuel cells oxidize fuel high (e.g., lower primary alcohols including methanol and ethanol) in hydrogen content directly, without the hydrogen first being separated by a reforming process are particularly useful. For example, in a typical methanol fuel cell, methanol is oxidized to produce electricity, heat, water, and carbon dioxide shown in the equation:

Anode: $CH_3OH + H_2O \rightarrow CO_2 + 6H^+ + 6e^-$

Cathode: $O_2 + 4e^- + 4H^+ \rightarrow 2H_2O$

Net: $2CH_3OH + 3O_2 \rightarrow 4H_2O + CO_2$

Platinum (Pt) is the best catalyst for many electrochemical reactions, including methanol oxidation. One major obstacle to the development of platinum containing catalytic electrodes for electrochemical reactions is the expense associated with the use of platinum metal. Another major obstacle in the development of platinum containing catalytic electrodes for electrochemical reactions is the loss of electrochemical activity due to "poisoning" by carbon monoxide (e.g., an intermediate in the oxidation of methanol to carbon dioxide). The CO molecule is strongly adsorbed on the electroactive surface of the electrode, obstructing the oxidation of new fuel molecules.

Various unsuccessful attempts have been made to find a solution to the CO poisoning problem; however, results have proven to be too expensive, ineffective or impractical to be commercially viable. Thus, there remains a need for electrocatalysts that are resistant to CO poisoning and can be used on the anode for alcohol oxidation in fuel cells.

Furthermore, current approaches in the art have yielded some materials that have improved electrocatalytic activities and are less expensive than pure Pt catalysts; however, the costs associated with these materials are still prohibitive for full exploitation of fuel cell technology. Other approaches are to completely remove Pt from these systems and replace it with less expensive materials, while retaining catalytic activity at least equal to that of Pt. For example, electroreduction of oxygen at non-platinum metallic combinations,[4] inorganic and organometallic complexes,[5] transition metal oxides,[6] calchogenides,[7] and enzyme electrodes[8] have been studied. Despite the extensive research that has been carried out in this area, the detailed mechanism of the ORR, even at Pt, is still uncertain.[9]

The foregoing problems have been recognized for many years and while numerous solutions have been proposed, none of them adequately address all of the problems in a single device, e.g., electrodes that retain acceptable electrocatalytic activity while being resistant to CO poisoning and providing a less expensive material than pure Pt catalysts.

SUMMARY OF THE INVENTION

The present inventors recognized a need for electrodes that retain acceptable electrocatalytic activity, while providing abundant, inexpensive, and efficient electrocatalytic materials, which are alternatives to pure Pt catalysts.

The present invention provides catalysts for the oxygen reduction reaction (hereafter referred to as "ORR") based on thermodynamic guidelines followed by the identification of optimum composition using scanning electrochemical microscopy. The present invention also demonstrates cathode catalysts, (e.g., Pd—Co—Au and Pd—Ti), incorporated into proton exchange membrane fuel cells (hereafter referred to as "PEMFC") that show essentially equal or slightly better performance than Pt. Additionally, the present invention provides cathodes having better tolerance to methanol when compared to Pt.

The present invention relates to bimetallic (and related) electrocatalysts for the ORR in acidic media. Based on thermodynamic principles assuming a simple mechanism where one metal breaks the oxygen-oxygen bond of molecular $O_2$ and the other metal acts to reduce the resulting adsorbed atomic oxygen. Analysis of the Gibbs free energies of these two reactions guides the selection of combinations of metals that can produce alloy surfaces with enhanced activity for the ORR when compared to the constituent metals. The present invention includes systems having arrays of metallic catalysts including various binary and ternary combinations of Pd, Au, Ag, and Co deposited on glassy carbon (hereafter referred to as "GC") substrates. The electrocatalytic activity of these materials for the ORR in acidic medium was examined using scanning electrochemical microscopy (hereafter referred to as "SECM") in a new rapid-imaging mode. SECM was used to rapidly screen arrays covering a wide range of catalyst compositions for their activity for the ORR in about 0.5 M $H_2SO_4$. Using the SECM technique, combinations of metals with enhanced electrocatalytic activities have been identified when compared with the constituent, pure metals. The addition of Co to Pd, Au, and Ag clearly decreased the ORR overpotential. Catalyst spots that exhibited enhanced electrocatalytic activity in the SECM screening technique were then examined using classical rotating disk electrode (hereafter referred to as "RDE") studies. The activity of carbon black supported catalyst mixtures on a GC rotating disk electrode and the electrocatalytic activity determined using the SECM screening technique showed agreement. C/Pd-Co electrodes (e.g., 10-30% Co) exhibited remarkable activity for ORR catalysis, close to that of carbon-supported Pt.

In accordance with the present invention, a method, system and apparatus are provided that are used to catalyze an oxygen reduction reaction. For example, the present invention includes an electrocatalyst for an oxygen reduction reaction having a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table. In one embodiment, Group VIII noble metal is Pd; however any metal from Group VIII can be used. The electrocatalysts can be bimetallic, for example the Pd:Ti may be formed in different ratios (e.g., 20:80 to 80:20 atomic percent). The electrocatalysts can be trimetallic, for example the Pd:Co:Au may be formed in different ratios (e.g., the atomic percent Co is between about 5% and 60%).

Another example, is a membrane-electrode assembly for use in a PEMFC including an electrode having an anode and a cathode with one or more catalyst layers having a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table deposited onto at least a portion of the diffusion layer having a carbon black powder, polytetrafluoroethylene and a carbon cloth.

The present invention also provides a method of producing an electrocatalytic electrode by applying an electrode substrate with a first solution having a Group VIII noble metal, applying an electrode substrate with a second solution having one or more metals selected from Groups IIIA, IVA, VIII, IB, IIB, VB, VIB, VIIB and VIIIB of the Periodic Table, wherein the Group VIII noble metal, the one or more metals of the second solution or both the Group VIII noble metal and the one or more metals of the second solution are, when not an oxide, capable of thermal decomposition to the corresponding oxide, decomposing thermally the first solution and the second solution, other than the oxides, to the corresponding oxides or mixed oxides and curing the first solutions and second solutions at an elevated temperature.

Another example, is a fuel cell (e.g., a methanol and/or ethanol fuel cell) having an oxidizable fuel source and an anode in ionic contact with an electrocatalytic cathode having a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table.

For example, the present invention includes a method of identification of optimum composition using scanning electrochemical microscopy by exposing two or more electrocatalyst spots of an electrocatalyst spot array to an electrolyte solution, addressing two or more electrocatalyst spots of an electrocatalyst spot array with a scanning electrochemical microscopy probe tip, generating oxygen at the scanning electrochemical microscopy probe tip, measuring the oxygen reduction current at the two or more electrocatalyst, and identifying one or more electrocatalyst spots.

For example, the present invention provides a method of selecting metallic catalyst candidates by exposing two or more electrocatalyst spots of an electrocatalyst spot array to an electrolyte solution, addressing two or more electrocatalyst spots of an electrocatalyst spot array with a scanning electrochemical microscopy probe tip, generating oxygen at the scanning electrochemical microscopy probe tip, measuring the oxygen reduction current at the two or more electrocatalyst, and selecting one or more electrocatalyst spots.

Another example of the present invention includes a method of screening a metallic electrocatalyst array for electrocatalyst activity by exposing two or more electrocatalyst spots of an electrocatalyst spot array to an electrolyte solution, contacting two or more electrocatalyst spots of an electrocatalyst spot array with a scanning electrochemical microscopy probe tip, generating oxygen at the scanning electrochemical microscopy probe tip, measuring the oxygen reduction current at the two or more electrocatalyst, and measuring the oxygen reduction current at the two or more electrocatalyst.

In another example, the present invention provides a method of testing or screening numerous multicomponent, metallic electrocatalyst spots having varying compositions by exposing two or more electrocatalyst spots of an electrocatalyst spot array to an electrolyte solution, contacting two or more electrocatalyst spots of an electrocatalyst spot array with a scanning electrochemical microscopy probe tip, generating oxygen at the scanning electrochemical microscopy probe tip, measuring the oxygen reduction current at the two or more electrocatalyst and scanning the electrocatalyst spot array.

The method may further include varying the substrate array potential and measuring the substrate current as a function of scanning electrochemical microscopy probe tip position to produce a scanning electrochemical microscopy image. The two or more electrocatalyst spots include a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table. The two or more electrocatalyst spots may have similar or different compositions of Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table.

A method is also disclosed to generate a metallic catalyst candidate array of different compositions from a variety of combinations of metals by depositing two or more electrocatalyst spots on a glass carbon substrate, depositing a first solution having one or more metals to the glass carbon substrate, and depositing a second solution having one or more metals to the first solution. Also provided is a method of making a metallic electrocatalyst array by depositing two or more electrocatalyst spots on a glassy carbon substrate, depositing a first solution having one or more metals to the glassy carbon substrate and depositing a second solution having one or more metals to the first solution.

The present invention also includes a method of making a membrane-electrode assembly electrode by spraying carbon black powder to form a gas-diffusion layer including polytetrafluoroethylene and a solvent (mixture of water and isopropyl alcohol) onto a teflonized carbon cloth; and uniaxially pressing an anode and a cathode onto a membrane.

The present invention also provides a catalytic activity of carbon supported Pd—Co—Mo for oxygen reduction reaction (ORR) in single cell proton exchange membrane fuel cell (PEMFC) at 60° C. and compares the data with those of commercial Pt catalyst and our previously reported Pd—Co—Au and Pd—Ti catalysts. The Pd—Co—Mo catalyst with a Pd:Co:Mo atomic ratio of about 70:20:10 exhibits higher catalytic activity like the Pd—Co—Cu catalyst than the commercial Pt catalyst, but with excellent chemical stability unlike the Pd—Co—Au catalyst. The Pd—Co—Mo catalyst also exhibits better tolerance to methanol poisoning than Pt. Catalytic activity of the Pd—Co—Mo system with varying composition and heat treatment temperature reveals that a Pd:Co:Mo atomic ratio of about 70:20:10 with a heat treatment temperature of about 500° C. exhibits the highest catalytic activity. Although the degree of alloying increases with increasing temperature from about 500 to about 900° C. as indicated by the X-ray diffraction data, the catalytic activity decreases due to an increase in particle size and a decrease in active surface area.

The present invention includes an electrocatalyst for an oxygen reduction reaction. The electrocatalyst includes a Group VIII noble metal in contact with two or more metals. The two or more metals are selected from Groups IIIA, IVA, VIII, IB, IIB, VB, VIB, VIIB and VIIIB of the Periodic Table.

The present invention also provides a membrane-electrode assembly (MEA) for use in a proton exchange membrane fuel cell. The MEA includes an anode, a cathode and a diffusion layer. The cathode includes one or more catalyst layers having a Group VIII noble metal in intimate contact with a component M to form a Group VIII noble metal-M alloy. The component M is one or more metals selected from Groups IIIA, IVA; VIII, IB, IIB, VB, VIB, VIIB and VIIIB of the Periodic Table deposited onto at least a portion of the diffusion layer.

For example, the present invention includes a method of producing an electrocatalytic electrode by applying an electrode substrate with a first solution having a Group VIII noble metal and a second solution having one or more metals selected from Groups IIIA, IVA, VIII, IB, IIB, VB, VIB, VIIB and VIIIB of the Periodic Table. The Group VIII noble metal, the one or more metals of the second solution or both the Group VIII noble metal and the one or more metals of the second solution are, when not an oxide, capable of thermal decomposition to the corresponding oxide. The first solution and the second solution, when other than the oxides, are decomposed thermally to the corresponding oxides or mixed oxides and the first solutions and second solutions are cured at an elevated temperature.

Furthermore, the present invention provides a method of generating a metallic electrocatalyst candidate array of a variety of electrocatalyst compositions by depositing one or more electrocatalyst spots on a glass carbon substrate, depositing a first solution having one or more Group VIII metals to the glass carbon substrate and depositing a second solution having two or more metals to the first solution.

A fuel cell electrode is also provided. The fuel cell includes an electrode having an anode in ionic contact with an electrocatalytic cathode. The electrocatalytic cathode includes a Group VIII noble metal in intimate contact with a component-M to form a Group VIII noble metal-component-M alloy. The component-M is two or more metals selected from groups IIIA, IVA, VIII, IB, IIB, VB, VIB, VIIB and VIIIB of the Periodic Table.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
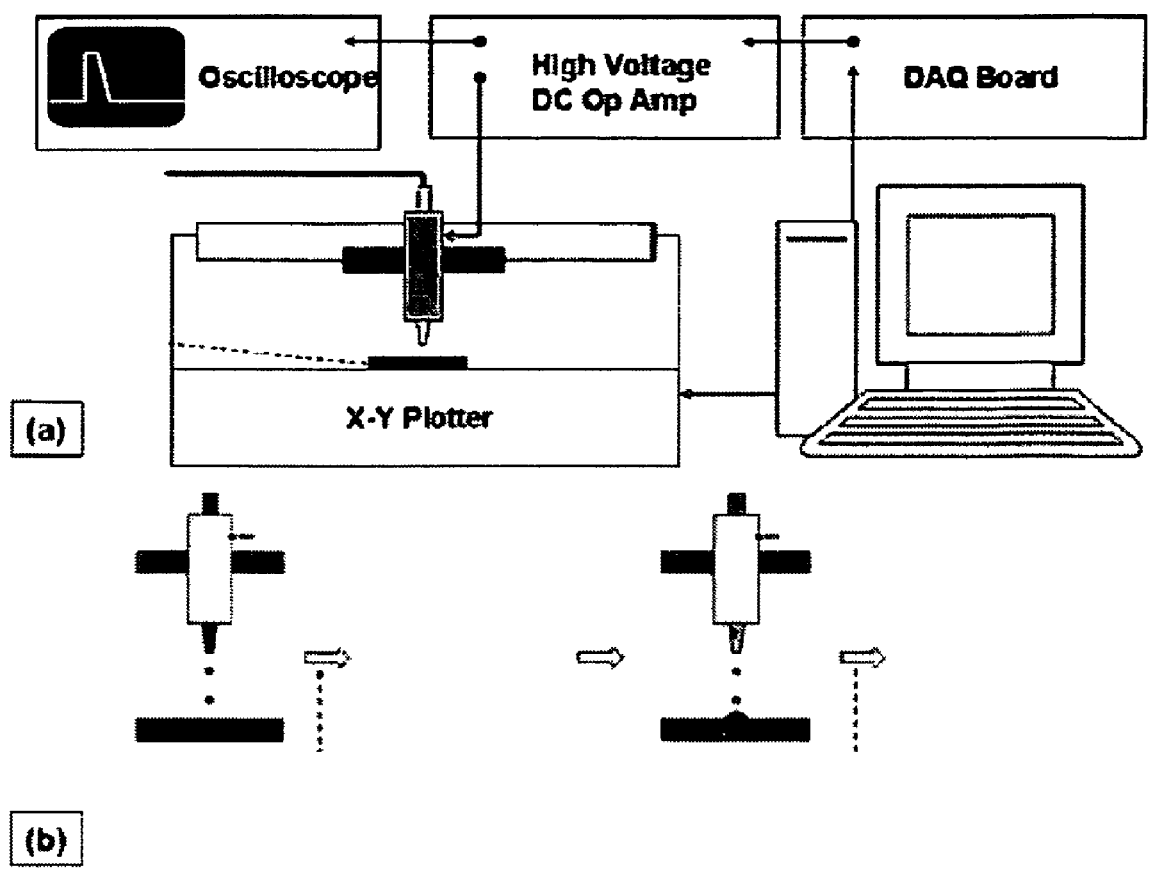
FIG. 1 is a schematic of the setup for preparation of catalyst spots and the deposition of catalyst precursor solutions spots.

While the making and using of various embodiments of the present invention are discussed in detail below, it should be appreciated that the present invention provides many applicable inventive concepts that can be embodied in a wide variety of specific contexts. The terminology used and specific embodiments discussed herein are merely illustrative of specific ways to make and use the invention and do not delimit the scope of the invention.

In accordance with the present invention, a method, system and apparatus are provided that catalyze an oxygen reduction reaction. For example, the present invention includes an electrocatalysts for an oxygen reduction reaction having a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table. In one embodiment, Group VIII noble metal is Pd; however any metal from Group VIII can be used. The electrocatalysts can be bimetallic, for example the Pd:Ti may be formed in different ratios (e.g., 20:80 to 80:20 atomic percent). The electrocatalysts can be trimetallic, for example the Pd: Co:Au may be formed in different ratios (e.g., the atomic percent Co is between about 5% and 60%).

Another example, is a fuel cell in particular a methanol fuel cell having an oxidizable fuel source and an anode in ionic contact with an electrocatalytic cathode comprising a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table.

In another example the present invention provides a method of testing or screening numerous multicomponent, metallic electrocatalyst spots having varying compositions by exposing two or more electrocatalyst spots of an electrocatalyst spot array to an electrolyte solution, contacting two or more electrocatalyst spots of an electrocatalyst spot array with a scanning electrochemical microscopy probe tip, generating oxygen at the scanning electrochemical microscopy probe tip, measuring the oxygen reduction current at the two or more electrocatalyst and scanning the electrocatalyst spot array. The method may further include varying the substrate array potential and measuring the substrate current as a function of scanning electrochemical microscopy probe tip position to produce a scanning electrochemical microscopy image. The two or more electrocatalyst spots include a Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table. The two or more electrocatalyst spots comprise similar or different compositions of Group VIII noble metal in intimate contact with a component M to form a Group VIII noble metal-M alloy, wherein M is one or more metals selected from Groups IIIA, IVA, VIII, IB, IIB, VB, VIB, VIIB and VIIIB of the Periodic Table.

A method is disclosed to generate a metallic catalyst candidate array of different compositions from, a variety of combinations of metals by depositing two or more electrocatalyst spots on a glass carbon substrate, depositing a first solution having one or more metals to the glass carbon substrate, and depositing a second solution having one or more metals to the first solution. Provided is a method of making a metallic electrocatalyst array by depositing two or more electrocatalyst spots on a glassy carbon substrate, depositing a first solution having one or more metals to the glassy carbon substrate, and depositing a second solution having one or more metals to the first solution.

Another example, is a method of making a carbon supported electrocatalysts by forming a mixture of one or more microemulsions having one or more metals, a surfactant and an oil phase, adding a carbon source to the mixture of one or more microemulsions and drying the mixture.

Proton exchange membrane fuel cells are appealing for a variety of applications including transportation, since they offer environmentally benign power generation and easy maintenance. In the first fuel cell studies in 1839, Grove used platinum (Pt) electrodes, and even today Pt supported on carbon is the most widely used electrocatalyst for the oxygen reduction reaction (hereafter referred to as "ORR") in PEMFC due to its high activity and excellent chemical stability in the fuel cell environment. However, the world's limited supply of platinum and its high cost pose serious problems for widespread commercialization of PEMFC technology.[40,41] These difficulties have created enormous interest in the search for less expensive, more abundant non-platinum electrocatalysts[3-16] that can offer acceptable performance.

The search for abundant, inexpensive, and efficient electrocatalytic materials as substitutes for Pt-based oxygen cathodes in polymer electrolyte membrane fuel cells is currently an active area of research. Efforts are also under way to increase the heterogeneous electron-transfer kinetics and the utilization of Pt. For example, the modification of carbon supports[1] and novel platinum deposition techniques[2] to increase the effective catalytic area and thereby decreasing the loading of precious metals. Novel approaches toward improving ORR electrocatalysis include replacement of some platinum with alternatives including less expensive metal (e.g., Co, Cr, Ni).[3]

The current approaches in the art have yielded some materials that have improved electrocatalytic activities and are less expensive than pure Pt catalysts; however, the costs associated with these materials are still prohibitive for full exploitation of fuel cell technology. Other approaches are to completely remove Pt from these systems and replace it with less expensive materials, while retaining catalytic activity at least equal to that of Pt. For example, electroreduction of oxygen at non-platinum metallic combinations,[4] inorganic and organometallic complexes,[5] transition metal oxides,[6] calchogenides,[7] and enzyme electrodes[8] have been studied.

Despite the extensive research that has been carried out in this area, the detailed mechanism of the ORR, even at Pt, is still uncertain.[9] The number of possible elementary steps and mechanistic routes in the reduction of $O_2$ to $H_2O$ is vast, since it involves four electron transfers, four proton transfers, and O-O bond cleavage. Adsorption of $O_2$ and a wide spectrum of oxygenated adsorbed intermediates probably also occurs, further complicating kinetic treatments of experimental data. Quantum mechanical calculations (e.g., ASED-MO, DFT)[10-12] are being applied to determinate optimal structures and adsorption energies and to predict synergetic effects in multicomponent model systems. The complexity of the mechanism makes it difficult to identify possible routes to improved electrocatalysts via purely mechanistic analysis. The complexity of these reactions have led to the application of high throughput, combinatorial screening methods in the search for novel metallic electrocatalysts.[13] For example, Mallouk and co-workers have shown that a large number of catalysts can be screened simultaneously using an optical fluorescence technique detecting proton production on deposited arrays of catalyst inks spanning a range of compositions onto carbon substrates.[14] However, Mallouk's screening method cannot provide any insight into the quantitative electrochemical behavior. Upon detection of a possible candidate catalyst using the optical method, the material must be prepared in bulk and applied to an electrode surface and the electrochemical behavior examined.[15]

Individually addressable array electrodes are also being investigated as rapid screening devices for novel electrocatalytic materials.[16-18] For example, methanol oxidation was studied using an individually addressable 25-electrode fuel cell device. SECM and combinations of SECM with other analytical methods have been proposed by Hillier and coworkers as reliable techniques for fuel cell anode screening, employing either hydrogen or methanol oxidation.[19]

The present invention provides a SECM method for studying ORR electrocatalysts.[20] Using the tip generation-substrate collection (hereafter referred to as "TG-SC") mode, the ORR electrocatalytic activity of a number of catalyst spots can be probed, including highly dispersed Pt and Ru. Importantly, the present invention provides a rapid screening method for testing large arrays of multicomponent, metallic electrocatalyst spots of varying compositions can be produced.

The present invention includes a method for selecting metallic catalyst candidates for the ORR. The present invention also provides a method to generate large candidate arrays of different compositions from a variety of combinations of metals and demonstrate the use of SECM as a rapid activity screening technique to obtain quantitative electrochemical information about the catalyst mixtures. Arrays of multimetallic catalyst spots with varying concentrations of metals on each spot have been prepared on carbon by chemical reduction of salt precursors deposited automatically under computer control of the present invention. The present invention also provides the use of SECM to measure the electrocatalytic activity of each catalyst spot and the effects of varying metal concentrations within each catalyst spot. Current-potential curves of carbon-supported catalysts using the RDE configuration allowed a direct comparison of the proposed catalysts with Pt.

Chemicals. GC plates (1 mm thick, 50×50 mm²) were purchased from Alfa Aesar (Ward Hill, Mass.). Prior to use, the GC plates were cut into small squares to produce the GC substrates (e.g., about 1 mm thick, about 15× about 15 mm²). $(NH_4)_2PdCl_4$ (Aldrich, Milwaukee, Wis.), $H_2AuCl_4$ (Alfa Aesar, Ward Hill, Mass.), $AgNO_3$ (Strem Chemicals, Newburyport, Mass.), $Co-(NO_3)_2(H_2O)_6$ (Aldrich, Milwaukee, Wis.), $Cu(NO_3)_2$ (Spectrum Chemical, Gardena, Calif.), glycerol (Alfa Aesar, Ward Hill, Mass.), $(C_3H_7O)_4Ti$ (Fluka), $NaBH_4$ (Aldrich), ethylene glycol (Alfa), glycerol (Alfa Aesar) and sulfuric acid (98%, Alfa Aesar, Ward Hill, Mass.) were all of reagent grade and were used as received. Reagent solutions were prepared using Milli-Q water (Millipore Co., Bedford, Mass.). Vulcan XC-72R carbon was purchased from the Cabot Corporation (Bellerica, Mass.).

Preparation of Catalyst Spots. Catalyst spots including mixtures of Pd, Ag, Au, and Co or Cu arranged in high-density arrays were prepared on GC by reduction of metal salt precursors with hydrogen. Solutions containing 0.3 M metal were prepared by dissolving the metal salt in water-glycerol (e.g., about 3:1). Binary and ternary arrays of spots containing mixtures of these solutions were deposited on GC plates using a piezo-based microarray dispenser. A commercial piezo-dispenser (e.g., MicroJet AB-01-60 from MicroFab, Plano, Tex.), capable of dispensing picoliter-sized droplets by application of potential pulses, was installed onto a plotter head (e.g., Houston Instruments DMP-5, Houston, Tex.) to control its position with a resolution of 100 μm/step.

FIG. 1A is a schematic of a piezo-dispenser capable of dispensing picoliter-sized droplets by application of potential pulses installed onto a plotter head to control its position with a resolution for preparation of catalyst spots. Typically, pulses of about 50-60 V and about 25 μs were applied to the piezo-dispenser using a DAQ board (e.g., Keithley Series 500, Cleveland, Ohio) coupled to a high voltage DC Op Amp (e.g., Burleigh PZ-70, Fisher, N.Y.) to eject reproducible single drops of about 100 pL. The mixtures were prepared in situ on each spot. Different quantities of each component precursor were dispensed individually at each spot. Referring to FIG. 1 a Dispenser system 10, includes a control unit 12 that is attached to an acquisition mechanism 14. The control unit 12 may be in the form of a computer; however, the control unit 12 may also be in the form of a processor and memory device or manual device. Furthermore, in some instances the acquisition mechanism 14 may be an external data acquisition board in communication with the control unit 12. In other embodiments, the acquisition mechanism 14 may be internally located within a portion of the control unit 12. The control unit 12 is also in electronic communication with an amplifier 16. The amplifier 16 may be a high voltage DC amplifier; however, persons of skill in the art will know that other amplifiers may be used. The amplifier 16 may be connected to the control unit 12 directly or integrated into the control unit 12; however the amplifier 16 may be integrated into the acquisition mechanism 14 or be in electrical communication with an acquisition mechanism 14. In some instances, multiple amplifiers 16 may be connected in various combinations and configurations as known to persons of skill in the art. The amplifier 16 is in communication with the dispenser mechanism 18. An oscilloscope 20 is also in electronic communication with the control unit 12. In some embodiments, the oscilloscope 20 is connected to the amplifier 16; however, other configurations are contemplated. The dispenser mechanism 18 is connected to the control unit 12 and to a pressure controller 22. The dispenser mechanism 18 is positioned to dispense onto a support 24 that is supported by plotter 26. The plotter 26 is in communication with the control unit 12. In some instances, the plotter 26 is an X-Y plotter; however, other positioning devices are contemplated herein.

FIG. 1B is an illustration of the sequence for the deposition of catalyst precursor solutions for in situ preparation of multicomponent spots on support 24. Initially, the dispenser mechanism 18 is filled with the solution of component "A". Different numbers of drops at each location were then dispensed onto support 24, depending on the desired composition of each spot. The dispenser mechanism 18 was then emptied, washed out thoroughly, and refilled with a solution of component "B". Specific numbers of drops of component "A" were then dispensed onto the pre-existing spots containing component "A." The cycle was then repeated as many times as necessary to achieve the desired compositions of the catalyst spots. The total number of moles of metal on each catalyst spot was maintained constant. Finally, the array of catalyst mixtures was agitated for 5 min using a Vortex Genie 2 agitator (Fisher, Pittsburgh, Pa.) to facilitate thorough mixing of the components on each spot. The array was dried at 150° C. under argon for 30 min and immediately reduced under hydrogen (1 atm) at 350° C. for 1 hour using a tube furnace (e.g., Barnstead International, Dubuque, IA). In the case of the binary arrays, each composition was prepared 3 times to check the reproducibility of the catalyst spot preparation.

Rotating Disk Electrode (RDE) Preparation. In one example, supported catalysts were prepared on carbon black with a metal loading of about 20 weight percent. Typically, about 16 mg of Vulcan XC72R (Cabot Co., Billerica, Mass.) was dispersed in 5 mL of the metal salts in a water-ethanol (e.g., about 1:4) solution. The suspension was then agitated ultrasonically for about 30 min and dried in air at about 87° C. The dried solid was placed in a porcelain boat and heated under hydrogen (e.g., about 1 atm) at about 350° C. for about 1 hour in a tube furnace (Barnstead International, Dubuque, IA). The solid was then washed thoroughly with water, filtered and dried in air. An ink powder was made by dispersing 8 mg in 200 μL of about 5 weight percent Nafion alcoholic solution (Aldrich, Milwaukee, Wis.) and agitated ultrasonically for about 15 minutes. Then 0.3 μL of ink was deposited on a 3 mm diameter (e.g., 0.071 $cm^2$) GC RDE (Pine Instruments, Grove City, Pa.) and dried for about 30 s at about 40° C. The metal loading was about 34 μg $cm^{-2}$. RDE studies were performed using a standard three-electrode cell configuration employing a platinum wire counter electrode and a Hg/Hg2SO4 reference electrode. A CH model 660 potentiostat (CH Instruments, Austin, Tex.) was employed for electrochemical measurements. The RDE was rotated at 2000 rpm using a Pine Instruments Analytical Rotator Model ASR2 (Pine Instruments, Grove City, Pa.). Rotating disk polarization curves were recorded in $O_2$-saturated 0.5 M $H_2SO_4$ with a constant flow of $O_2$ (e.g., about 1 atm) through the electrolyte at a potential sweep rate of about 10 mV $s^{-1}$.

Preparation of carbon supported Pd—Co—Au electrocatalysts. The carbon supported Pd-based catalysts (hereafter referred to as Pd—Co—Au/C) with a metal(s) loading of about 20 weight percent was prepared by a reverse microemulsion method using sodium dioctylsulfosuccinate (AOT) as the surfactant and heptane as the oil phase. Microemulsion I was prepared by mixing required amounts of ammonium hexachloropalladate, cobalt nitrate, dihydrogen tetrachloroaurate, AOT, deionized water, and heptane under constant stirring followed by ultrasonication for about 20 minutes. Microemulsion II was prepared by mixing sodium borohydride, AOT, deionized water and heptane under constant stirring followed by ultrasonication for about 20 minutes. In both the microemulsion, the molar ratio of water to AOT was kept at about 10:1. Microemulsion I and Microemulsion II were mixed together and ultrasonicated for 2 hours. After that, an appropriate amount of carbon (Vulcan XC 72R) was added to the mixture to give a metal(s):C weight ratio of about 20:80. The resultant slurry was kept under constant stirring for about 2 hour, filtered, washed copiously with acetone and deionized water, and dried in an air oven for about 2 hours. In order to study the effect of heat-treatment on the catalytic activity, the samples thus synthesized were heated at 500, 750 and 900° C. in a flowing mixture of 10% $H_2$-90% Ar for about 1 hour followed by cooling to about room temperature at a rate of about 5° C./minutes.

Preparation of carbon supported Pd—Ti electrocatalyst. The carbon supported Pd—Ti catalyst (referred to as Pd—Ti/C) with a metal loading of about 20 weight percent was prepared by an impregnation method. The precursor solutions used were about 0.4 M titanium isopropoxide and about 0.4 M ammonium tetrachloropalladate in ethylene glycol. Required amount of Vulcan XC-72 R carbon was suspended into the ethylene glycol solution containing required amounts of the metal salts. To the suspension, about 50 mL of acetone was added and ultrasonicated for about 30 min, followed by evaporating the solvent on a hot plate. The resulting material was placed in a porcelain boat and heated at about 550° C. for about 1 hour in $H_2$ atmosphere. Further heat treatment was carried out in a flowing mixture of about 10% $H_2$-90% Ar at about 900° C. for about 2 hour, followed by cooling to room temperature at a rate of about 5° C./min.

Sample characterization. The Pd—Co—Au/C and Pd—Ti/C samples may be characterized by X-ray diffraction patterns recorded at a slow scan rate between about 10 and 70° C. with a counting time of about 10 s per 0.02° C.

Membrane-electrode assembly fabrication. The electrodes for testing in single cell PEMFC consisted of gas diffusion and catalyst layers. A teflonized carbon cloth was employed as current collector and electrode support. The gas-diffusion layer was made by spraying a mixture including carbon black powder (Vulcan XC-72R), 40 weight percent polytetrafluoroethylene (hereafter referred to as "PTFE"), and a solvent (mixture of water and isopropyl alcohol) onto a teflonized carbon cloth and drying in vacuum at about 300° C. for about 2 hours. On top of this gas diffusion layer, the catalyst layer was deposited by spraying a mixture of the required amount of carbon-supported metal(s) catalyst, solvent (mixture of water and isopropyl alcohol) and about 33 weight percent Nafion, followed by sintering in vacuum at about 90° C. for about 1 hour; all the electrodes had a uniform catalyst metal loading of 0.2 mg/$cm^2$. The membrane-electrode assembly (MEA) was then fabricated by uniaxially hot-pressing the anode and cathode onto a pretreated Nafion 115 membrane (C.G.Processing) at about 130° C. for about 2 minutes. Before fabricating the MEA, the Nafion membrane was treated with about a 5 weight percent solution of $H_2O_2$, washed with deionized water, and then treated with 1 M $H_2SO_4$.

Fuel cell electrochemical characterization. The performances of the MEAs in PEMFC with the Pd-based catalysts synthesized as cathodes and commercial Pt/C (e.g., about 20 weight percent platinum on carbon, Johnson Matthey) as anodes were evaluated with a commercial fuel cell system (Compucell GT, Electrochem) and a single cell rig with about 5 $cm^2$ active geometrical area. Galvanostatic polarization studies were conducted at about 60° C. with humidified hydrogen and oxygen gas reactants; the hydrogen and oxygen pressures were about 18 and about 20 psi respectively. For a comparison, a commercial sample of platinized carbon (e.g., about 20 weight percent platinum on carbon, Johnson Matthey) was also examined as cathode.

Scanning Electrochemical Microscopy. To avoid possible contamination of catalyst spots with Pt from anodic dissolution of Pt SECM tips, tungsten or Au tips were used to generate oxygen during the ORR TG-SC measurements. The SECM probe tips were constructed by heat-sealing Au or tungsten wires in borosilicate glass capillaries under vacuum, followed by polishing and sharpening.[21] A 25 μm diameter W (Alfa) or Au (Aldrich) wire was heat-sealed in a borosilicate glass capillary (O.D./I.D. about 2.0/0.9 mm) under vacuum. The bottom cross section was polished with sandpaper until the metal disk was exposed. The tip was then polished with a sequence of alumina (e.g., from about 1.0 to 0.05 μm) and sharpened until an RG of about 5 was obtained. In one embodiment, SECM measurements were performed using a PC-controlled CHI model 900 SECM (CH Instruments, Austin, Tex.) employing piezo inchworms (Burleigh Instruments Inc., Fishers, N.Y.) to control the x-y-z displacement.

Constant tip-current TG-SC measurements were performed by controlling the substrate potential using the SECM and controlling the tip current using a 9 V battery power source between the tip (positive) and the auxiliary electrode.[20] A Hg/Hg2SO4 reference electrode and a Au wire (e.g., diameter about 0.5 mm) were used as reference and auxiliary electrodes, respectively. The SECM cell was carefully designed to reduce the sample tilt. The GC plate supporting the array was laid on top of a copper stripe (about 1× about 5 cm$^2$) placed on a flat acrylic base. The Teflon cell with about a 1 cm diameter aperture containing an FETFE O-ring was then placed on top of the GC plate and tightened using two connecting screws. Thus, the array was exposed to the electrolyte, 0.5 M $H_2SO_4$. The cell was mounted on top of the regular SECM instrument stage and verified by SECM feedback scans that the tilt setup was $\Delta z/\Delta x$ (or y) <1.5 μm/mm.

Images obtained in TG-SC mode are much less sensitive to variations in the tip-substrate distance than those obtained using feedback mode SECM.[20] The SECM tip was translated toward the substrate surface using conventional feedback mode SECM,[21] employing the oxygen reduction reaction at the SECM tip to monitor the approach of the tip to the GC surface through negative feedback. Using the feedback approach curve, the tip-substrate distance was set at 30 μm and the electrolyte solution was then deoxygenated using argon for 30 min before performing SECM imaging. A blanket of argon was maintained over the electrolyte solution at all times during the study to avoid interference from atmospheric oxygen. The SECM tip, held 30 μm from the GC surface, was scanned in the x-y plane (x long direction), while electrogenerating $O_2$ from $H_2O$ at constant current. By scanning at step intervals of about 50 μm about every about 0.2 seconds, areas of about 7×7 mm$^2$ could be screened in about 5 hour. The substrate array potential ($E_S$) was held at different values where activity for $O_2$ reduction was detected on some spots. The substrate current ($i_S$), measured as a function of tip position to produce the SECM image, was larger when the $O_2$-generating tip passed over the more active spots. Therefore, the magnitude of the substrate current was used as a direct measure of the electrocatalytic activity of each catalyst spot. By plotting the steady state $i_s$ values as functions of potential, polarization curves for each spot could be obtained.

The detailed mechanism for oxygen reduction in acidic media remains poorly understood, although the first step probably involves the adsorption of molecular oxygen on the metal surface sites[9] or electron transfer to the $O_2$ molecule. In the so-called "peroxide pathway," as found with Hg, Au, and C, the first electroreduction step leads to the formation of superoxide ion ($O_2^{•-}$).[22]

The E° for this reaction is about −0.284 V vs a normal hydrogen electrode (hereafter reffered to as "NHE"), well negative of the E° of the 4e reduction to water, about 1.23 V vs NHE. While the potential where this reaction occurs will be shifted to more positive values by a fast following reaction of $O_2^{•-}$, one is limited in the extent of this shift by the decrease in the heterogeneous electron-transfer rate.[23] Thus, if this pathway is to be important in electrocatalysis at the needed positive potentials, strong adsorption of the $O_2^{•-}$ must be important. Moreover, to attain the 4e pathway to water, any hydrogen peroxide that is formed by the superoxide intermediate route[24] would have to undergo rapid 2e reduction to water or decomposition to water and $O_2$ as the step that accomplishes O—O bond cleavage. The alternative path (the so-called "direct route") to the 4e reduction involves an initial dissociative chemisorption,[25] involving the splitting of the O—O bond to form adsorbed oxygen atoms ($O^{•-}$).

The adsorbed oxygen atoms are then electroreduced to water, which actually involves a series of several elementary steps.

In a sense, it can be thought of as the direct "oxidation" of metal, M, followed by the electrochemical reduction of the oxide. From a simple analysis of these two reactions, it is obvious that metals that favor bond cleavage will stabilize the intermediate (MO), resulting in a highly negative reduction potential that is generally too negative to be of interest in power source applications.

Figure 2:
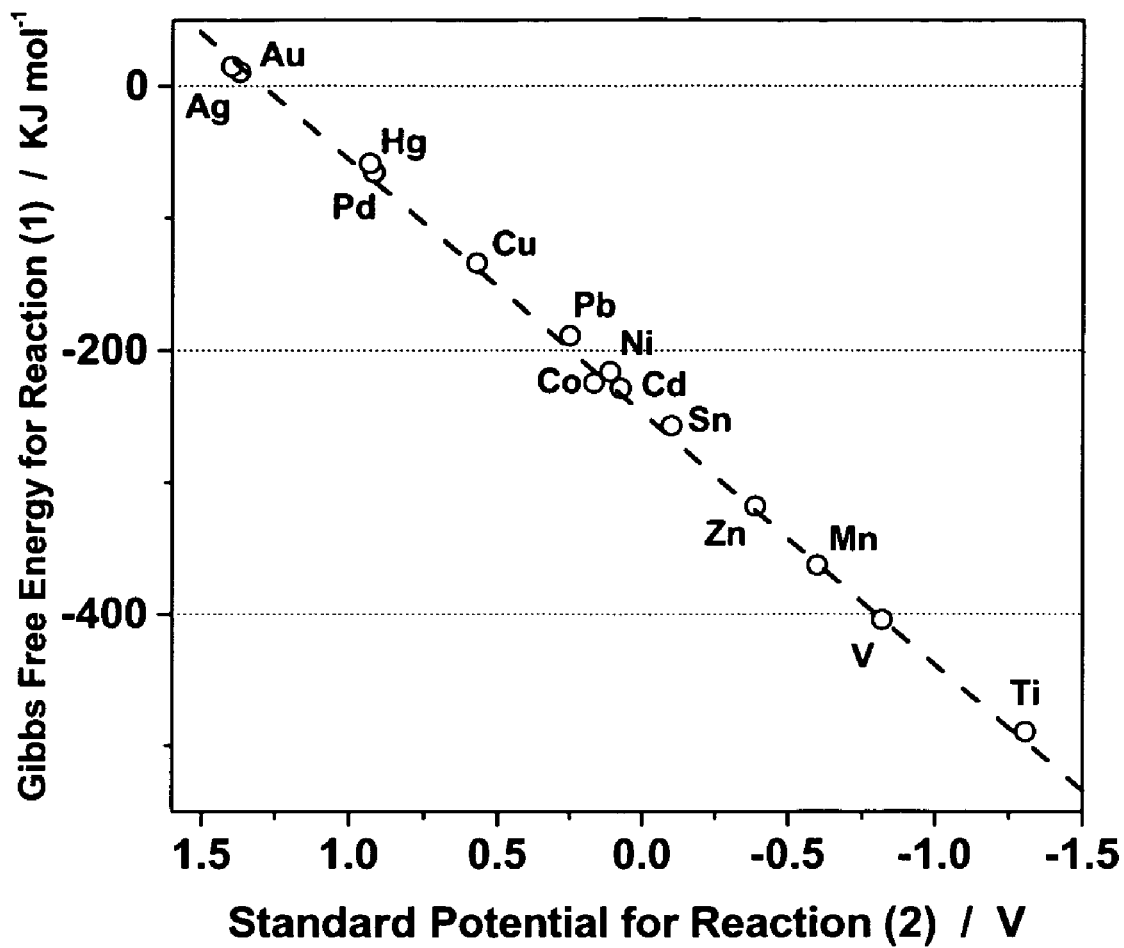
FIG. 2 is a graph of the Gibbs free energy for reaction versus the standard potential for reaction.

FIG. 2 is a graph of the Gibbs free energy for reaction 2 versus the standard potential for reaction 3. FIG. 2 shows data[26,27] for the Gibbs free energy for reaction 2 (assuming bulk oxide) versus the standard potential for reaction 3 for a number of metals and oxides of metals in the +2 oxidation state, however persons of skill in the art will know that it can be similarly extended to include other oxidation states, e.g., ±.1, 2, 3, 4, 5, 6. Metals in the lower right quadrant stabilize the M-O bond; thus negative potentials are required for the M-O reduction. Reaction 2 is thermodynamically unfavorable on metals in the upper left quadrant. These metals form less stable M-O bonds that are comparatively easier to reduce as shown by the positive reduction potentials for reaction 3.

Based on the data shown in FIG. 2, a oxygen bond cleaving metal (M) can be coupled with a second metal (M') that is more efficient (i.e., occurs at a more positive potential) for adsorbed oxygen atom (M'O) reduction. A bimetallic alloy system is required where O can migrate from M to M' where reduction will occur.

Figure 3:
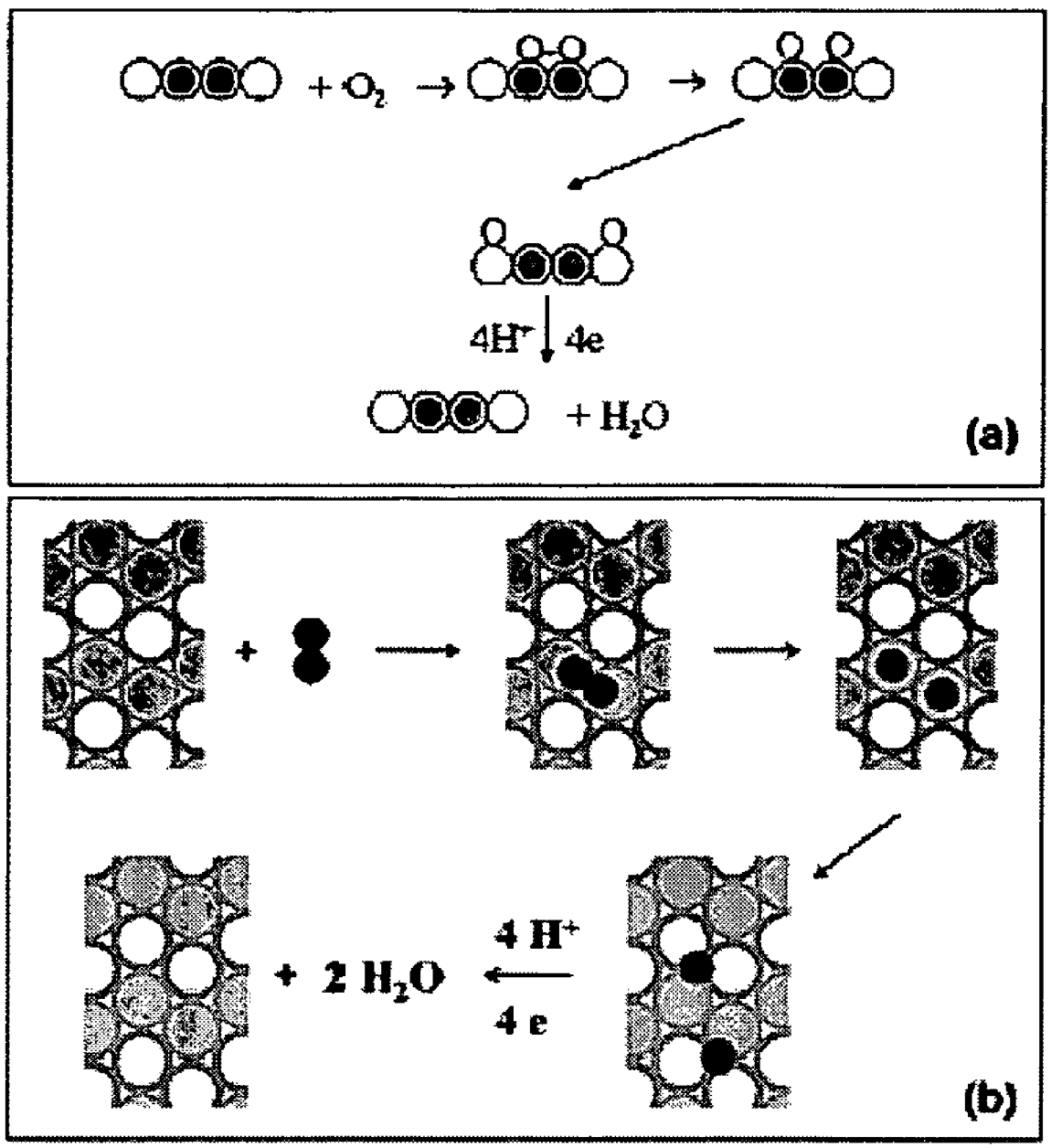
FIG. 3 is a diagram of the mechanism of the electrocatalysis of the present invention.

Now referring to FIG. 3(a) a schematic of the synergetic mechanism for enhanced electrocatalysis using bimetallic surfaces and FIG. 3(b) which is a schematic showing a top view schematic of the proposed mechanism. The large pink circles represent good oxygen bond cleaving metal atoms (M). Grey circles represent metal atoms that reduce adsorbed oxygen efficiently (M'). Small circles represent oxygen atoms. However, in the proper nanoscale system, migration from the A-top site of M to a 3-fold site involving M' would be possible, since oxygen could be more stable in such a 3-fold site.[12]

Clearly, the thermodynamics are different on the surface of a metallic phase and are certainly different in alloys. In addition, the assumption of perfect, intimate contact between different metal atoms within the surface is central in this model of oxygen electrocatalysis by bimetallic surfaces and implies excellent mixing and/or alloy formation.

Catalyst Preparation and Morphology. Again referring to FIG. 2, based on the illustrated data, a series of metals that provide good surfaces for the reduction of adsorbed atomic oxygen (e.g., Ag, Pd, and Au) were selected. These pure metals are individually poorly active for electroreduction of oxygen (e.g., Ag<Au<Pd) and yield a significant amount of hydrogen peroxide as subproduct.[28,30] The first step in the surface adsorption splitting of oxygen (e.g., direct route) is thermodynamically unfavorable on these metals. Metallic combinations are chosen that are completely miscible to ensure intimate contact of metals.

For example, the model predicts that a combination of Ag and Cu may provide a good surface thermodynamically for oxygen electroreduction. However, Ag and Cu are completely immiscible at room temperature[31] therefore no enhancement would be observed and this has been confirmed by SECM. In another example, since most of the metal oxides in the lower right quadrant dissolve rapidly in acidic solutions, especially in the presence of $O_2$, alloying them into a stable phase is important to avoid dissolution under these conditions. In one embodiment, the metal selected to provide a good surface for the initial molecular oxygen bond breaking was Co and the combination of Pd and Co. The combination of Pd and Co has been shown to exhibit high activity for $O_2$ electroreduction,[32] approaching that of platinum. Each alloy exhibited excellent stability over the experimental time scale and no significant corrosion of Co was visually observed, although pure Co corroded rapidly.

In one example, the dispenser device of the present invention arrays containing Pd, Ag, or Au admixed with Co of different compositions were constructed, wherein each spot of the array contained a constant total number of moles of the metal salts. Ag and Au are both poor oxygen reduction electrocatalysts, however the combinations of these two metals with Co were also employed to demonstrate the applicability of the present invnetion. It is known that these metals form stable solid solutions with Co.[31,33]

Figure 4:
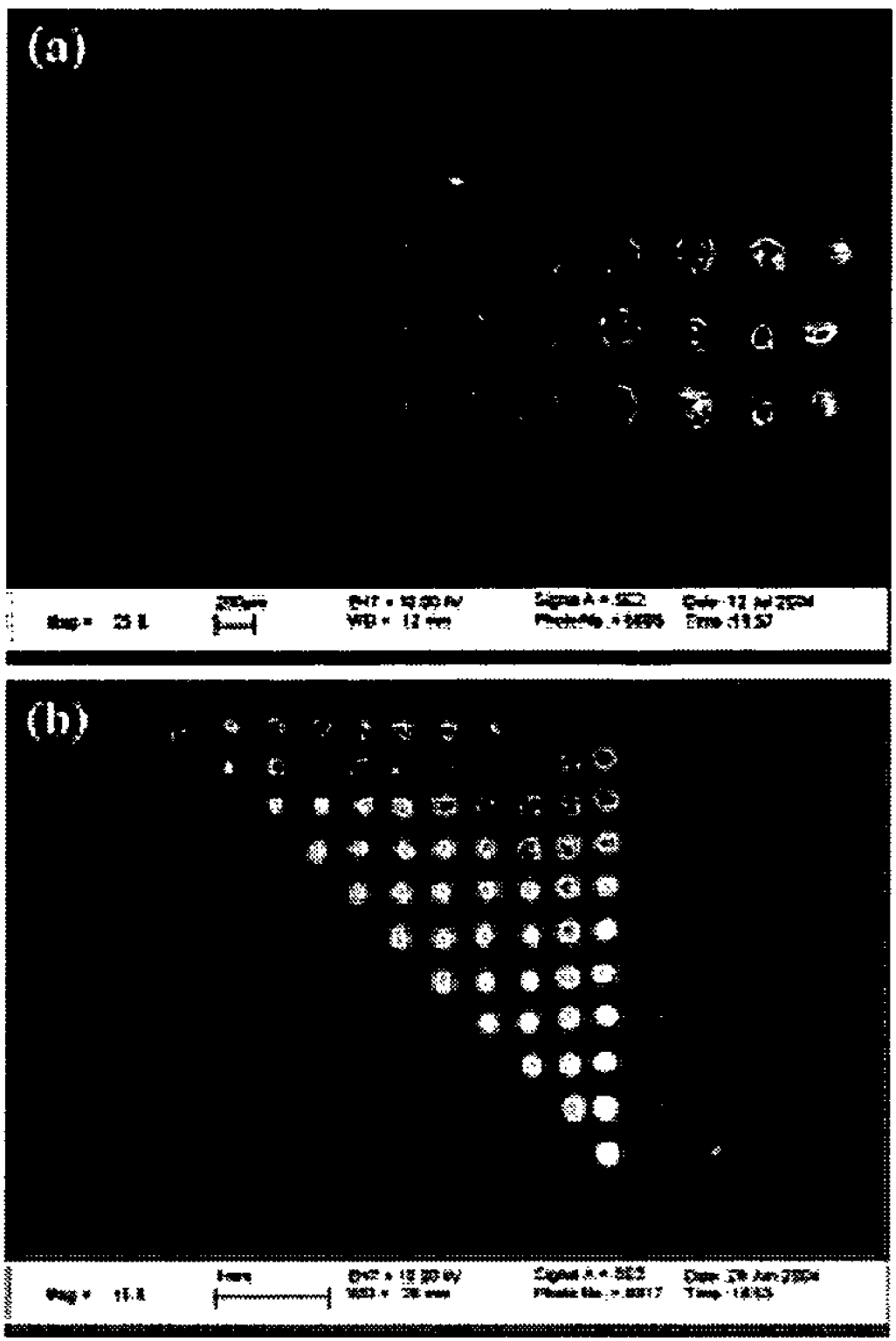
FIG. 4 is a SEM image of typical binary (a) and ternary (b) catalyst arrays of the present invention.

Scanning electron micrographs of typical arrays of catalyst spots including various amounts of Pd and Co are shown in FIG. 4. FIG. 4(a) is a SEM image of a typical binary Pd—Co catalyst array and FIG. 4(b) is a SEM image of a typical ternary catalyst array Pd—Au—Co. The rows consist of pure Pd spots (left) and increasing quantities of Co (e.g., about 10%, 20%, 30%, and so on, where all percentages given are atomic percent) to pure Co spots on the right. Each row was replicated 3 times forming a rectangular array and the intraarray reproducibility of each catalyst spot preparation was examine by repeating the deposition of each column.

FIG. 4(b) displays the versatility of the modified plotter picodispenser technique of the present invention. It is possible to construct ternary arrays of metallic catalysts over a wide range of compositions. For example, the array consists of pure Au (top), pure Pd (bottom right), and pure Co (top) with a wide range of mixtures of each metal in the intervening areas. Using the picodispenser technique of the present invnetion, good reproducibility between spots was observed and little variation was observed between spots of the same composition when using the same preparation procedure. However, the addition of about 20% glycerol to each dispensing solution was necessary to ensure a suitable solution viscosity for reproducible spot deposition. The addition of glycerol also prevented the spots from drying before addition of the second solution (e.g., Co). Each spot within an array was typically of the order of about 200 μm in diameter. Spots of each of the three metals examined (e.g., Pd, Co and Au) exhibited considerably rough morphologies, including dispersed particles with particle sizes in the range of between about 100 and 200 nm, as determined by SEM.

Energy-dispersive X-ray mapping of each metallic combination showed a relatively uniform distribution of the metals across each spot. However, the real surface area and the particle size are known to significantly affect the apparent electrocatalytic activity of materials.[34] However, particle size effects are commonly present only in particles smaller than 10 nm.[35] Thus, it is unlikely that this particle size effect would be observed in materials obtained by reduction of precursors with hydrogen at high temperature, since this method leads to large particle sizes.[36] In addition, the material porosity can affect these measurements, as occurs in RDE and ultramicroelectrode-based studies. For example, porous electrodes have an apparent activity much higher than the same smooth material, as evidenced by a decrease in the overpotential for a given apparent current density.[37] The present invention minimizes the effect by preparing and testing all of the materials under identical conditions, ensuring minimal variations in the roughness factors between spots. SEM measurements show little variation in the morphology of spots at different compositions.

SECM Activity Imaging and Characterization. For example, the constant tip current TG-SC SECM mode may be used to image the electrocatalytic activity of the arrays. Unlike the feedback mode, the TG-SC approach is more appropriate for imaging the activity of rough surfaces, since it is less sensitive to changes in the tip-substrate distance.[38]

Figure 5:
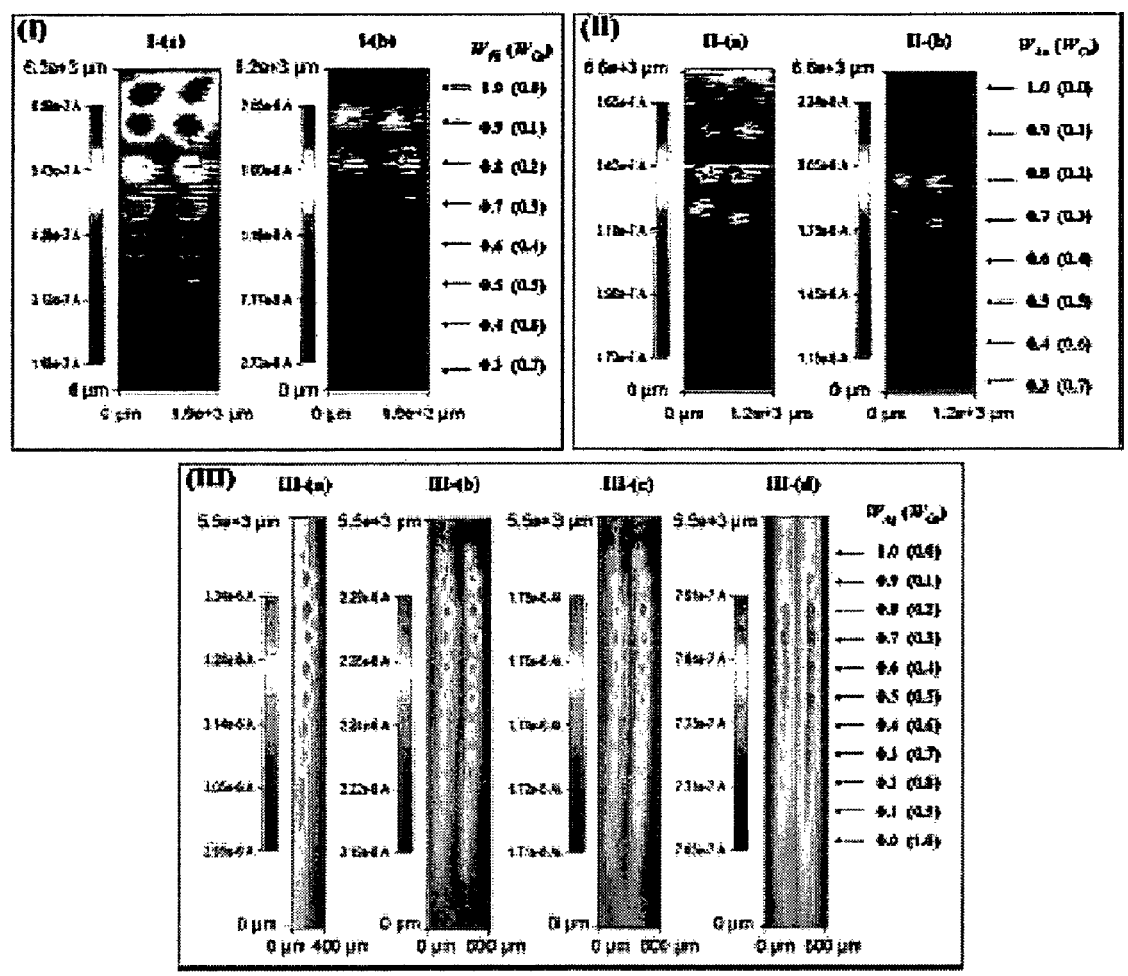
FIG. 5 is a SECM TG-SC image of oxygen reduction activity measured on binary arrays.

FIGS. 5(a)-5(c) are SECM TG-SC images of oxygen reduction activity under a variation in conditions. FIG. 5(a)(1) is a SECM TG-SC images of oxygen reduction activity measured on binary arrays of is Pd—Co in about 0.5 M $H_2SO_4$. The tip-substrate distance is 30 μm, tip current is −160 nA, with a scan rate of 50 μm each 0.2 s and an $E_S$ verses the HRE of 0.4 V. FIG. 5(a)(2) is a SECM TG-SC images of oxygen reduction activity measured on binary arrays of is Pd—Co in 0.5 M $H_2SO_4$. The tip-substrate distance is 30 μm, tip current is −160 nA, with a scan rate of 50 μm each 0.2 s and an $E_S$ verses the HRE of 0.7 V.

FIG. 5(b)(1) is a SECM TG-SC images of oxygen reduction activity measured on binary arrays of is Au—Co with a scan rate of 50 μm each 0.2 s and an $E_S$ verses the HRE of 0.2 V. FIG. 5(b)(2) is a SECM TG-SC images of oxygen reduction activity measured on binary arrays of is Au—Co with a scan rate of 50 μm each 0.2 s and an $E_S$ verses the HRE of 0.4 V.

FIG. 5(c)(1) is a SECM TG-SC images of oxygen reduction activity measured on binary arrays of is Ag—Co with a scan rate of about 20 μm each 0.017 s and an $E_S$ verses the HRE of about −0.05 V. FIG. 5(c)(2) is a SECM TG-SC images of oxygen reduction activity measured on binary arrays of is Ag—Co with a scan rate of about 20 μm each 0.017 s and an $E_S$ verses the HRE of about 0.05 V. FIG. 5(c)(3) is a SECM TG-SC images of oxygen reduction activity measured on binary arrays of is Ag—Co with a scan rate of about 20 μm each 0.017 s and an $E_S$ verses the HRE of about 0.15 V. FIG. 5(c)(4) is a SECM TG-SC images of oxygen reduction activity measured on binary arrays of is Ag—Co with a scan rate of about 20 μm each 0.01.7 s and an $E_S$ verses the HRE of about 0.2 V. $W_M$ is the atomic ratio of metal M in the spot.

FIG. 5(a)-(c) are SECM images of a Pd—Co array recorded at substrate potentials of about 0.4 V and about 0.7 V vs HRE are shown in FIG. 5(a)(1) and FIG. 5(b)(1), respectively. At a substrate potential of about 0.4 V, each Pd—Co combination exhibits activity for the ORR (up to about 70% Co). When the substrate potential is increased to more positive potentials to about 0.7 V, the 90:10 Pd/Co composition clearly showed the highest oxygen reduction activity. At more substrate potentials, pure Pd exhibited no activity, while catalyst compositions containing more than about 20% Co exhibited oxygen reduction activity that decreased with increasing concentrations of Co. Improvement of the electrocatalytic activity of Au upon addition of Co is also illustrated in FIG. 5(b)(1) and FIG. 5(b)(2). At substrate potentials of about 0.2 and about 0.4 V, about 70:30 Au—Co exhibited enhanced electrocatalytic activity for oxygen reduction when compared to each of the other Au—Co combinations. FIGS. 5(c)(1)-5(c)(4) shows the SECM images recorded for Ag—Co catalysts over a range of substrate potentials. At the most negative potential studied (e.g., E is about −0.05 V vs HRE), Ag and all Ag—Co combinations are clearly equally as active as catalysts for the ORR. However, as the substrate potential was systematically adjusted toward more positive potentials (e.g., about 0.0 V<E vs HRE<about 0.2 V), the Ag activity decreased to about zero while a range of the Ag—Co mixtures still retained their activity. In one embodiment the highest activity was observed at a Ag:Co ratio of about 80:20. Nonetheless, Au—Co and Ag—Co provide poorer electrocatalytic surfaces than Pd—Co, or even pure Pd. However, the observed enhancement of the electrocatalytic activity of Au and Ag upon alloying with Co is significant and tends to support the proposed model. As mentioned previously, the miscibility of the chosen metals is crucial to choosing electrocatalytic surfaces. Ag and Cu are completely immiscible at room temperature, and therefore, no enhancement of the electrocatalytic activity of silver or copper results upon mixing.

Figure 6:
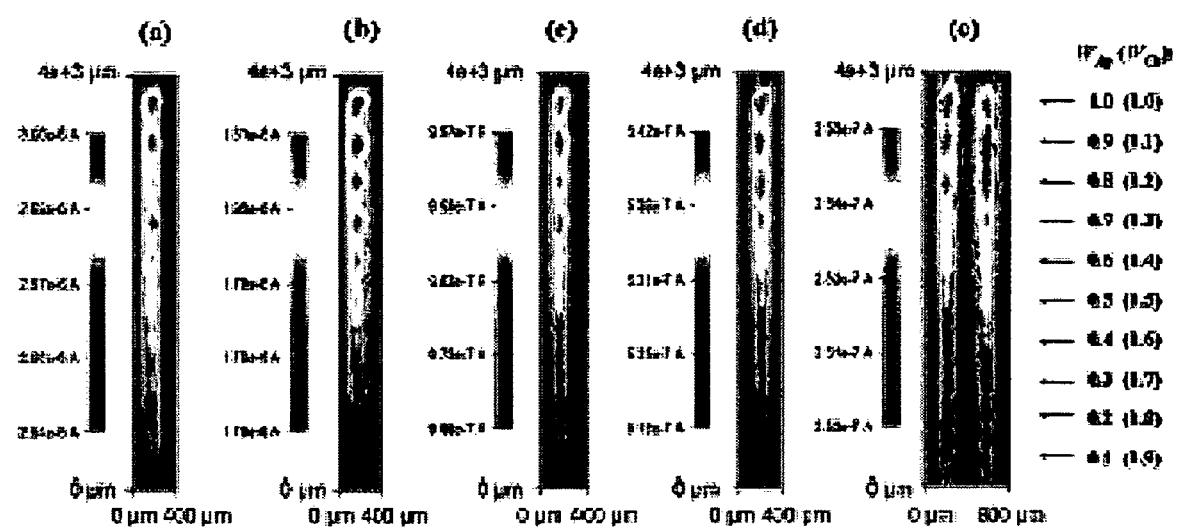
FIG. 6 is a SECM TG-SC image of oxygen reduction activity measured on binary arrays.

FIG. 6(a)-6(e) are SECM TG-SC images of oxygen reduction activity. FIG. 6(a) is a SECM TG-SC image of oxygen reduction activity measured on binary arrays of Ag—Cu in about 0.5 M $H_2SO_4$. Tip-substrate distance 30 μm, tip current is about −160 nA, the scan rate is 20 μm each 0.017 s, and when compared to a HRE an $E_S$ of about 0.0 V. FIG. 6(b) is a SECM TG-SC image of oxygen reduction activity measured on binary arrays of Ag—Cu in about 0.5 M $H_2SO_4$. Tip-substrate distance about 30 μm, tip current is about −160 nA, the scan rate is about 20 μm each 0.017 s, and when compared to a HRE an $E_S$ of 0.05V. FIG. 6(c) is a SECM TG-SC image of oxygen reduction activity measured on binary arrays of Ag—Cu in about 0.5 M $H_2SO_4$. Tip-substrate distance of about 30 μm, tip current of about −160 nA, the scan rate of about 20 μm each 0.017 s, and when compared to a HRE an $E_S$ of about 0.1 V. FIG. 6(d) is a SECM TG-SC image of oxygen reduction activity measured on binary arrays of Ag—Cu in about 0.5 M $H_2SO_4$. Tip-substrate distance about 30 μm, tip current is about −160 nA, the scan rate is 20 μm each 0.017 s, and when compared to a HRE an $E_S$ of about 0.15 V. FIG. 6(e) is a SECM TG-SC image of oxygen reduction activity measured on binary arrays of Ag—Cu in about 0.5 M $H_2SO_4$. Tip-substrate distance about 30 μm, tip current is about −160 nA, the scan rate is about 20 μm each 0.017 s, and when compared to a HRE an $E_S$ of about 0.2 V. $W_M$ is the atomic ratio of metal M in the spot. Unlike that observed for the Ag—Co combinations, it is not possible to detect any improvement of the activity of Ag—Cu spots with respect to pure Ag. At about 0.2 V, samples with less than about 30% Cu exhibited a very slight current response during SECM screening.

Figure 7:
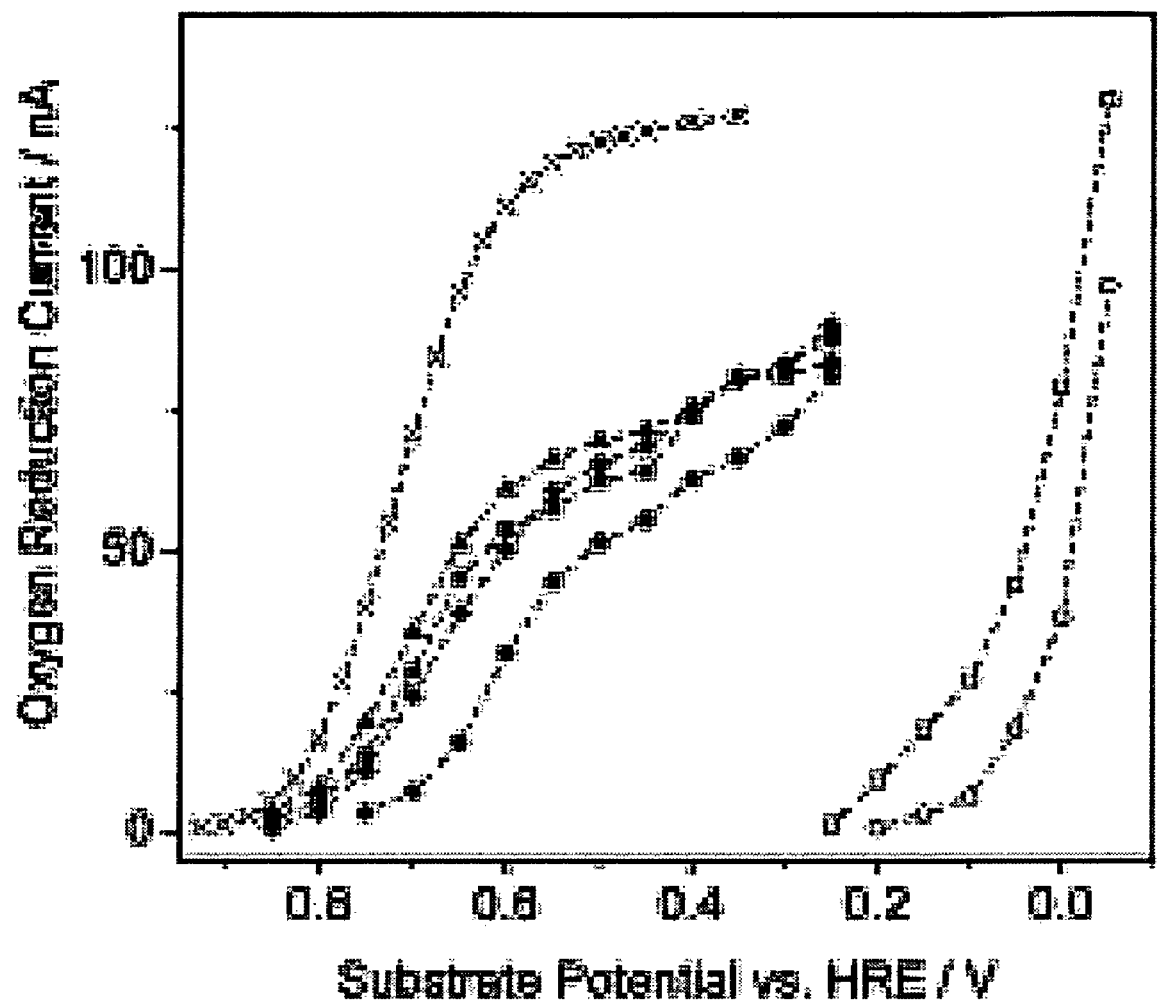
FIG. 7 is a plot of polarization curves obtained on individual spots.

FIG. 7 is a SECM TG-SC polarization curve plotting current verses potential. Another, more quantitative, approach toward monitoring electrocatalytic activity is through current-potential (hereafter referred to as "i-E") curves measured on each individual spot using the SECM technique.[20,38] i-E curves have been constructed for a range of Pd—Co and Ag—Co catalysts. FIG. 7 is a SECM TG-SC polarization curves obtained on individual spots of Pd—Co (solid symbols) and Ag—Co (open symbols) catalysts in about 0.5 M $H_2SO_4$. Tip current about −160 nA. Pd—Co combinations: at. % Pd=100 (•), 90 (■), 80 (▲), 70 (♦). The tip-substrate distance is about 50 μm. Ag—Co combinations: at about % Ag=100 (○), 80 (□); tip-substrate distance of 30 μm. Smooth Pt 100-μm disk (x); tip-substrate distance of 50 μm.

Addition of Co to pure Pd catalysts causes a shift in the entire Pd curve toward more positive potentials, indicating more efficient electrocatalysis. The highest activity is observed of all the catalyst mixtures studied at a Pd—Co ratio of 80:20, with an observed shift of the i-E curve of approximately about 150 mV, with an improvement of the catalytic performance of Ag (see FIG. 7). The addition of about 20% Co to Ag results in a shift of the i-E curve in a positive direction by approximately 100 mV. FIG. 7 also includes, as a reference point is the curve obtained for a smooth Pt electrode under identical conditions. Clearly, the electrocatalytic behavior observed for these catalytic systems does not compete with that of Pt.

Figure 8:
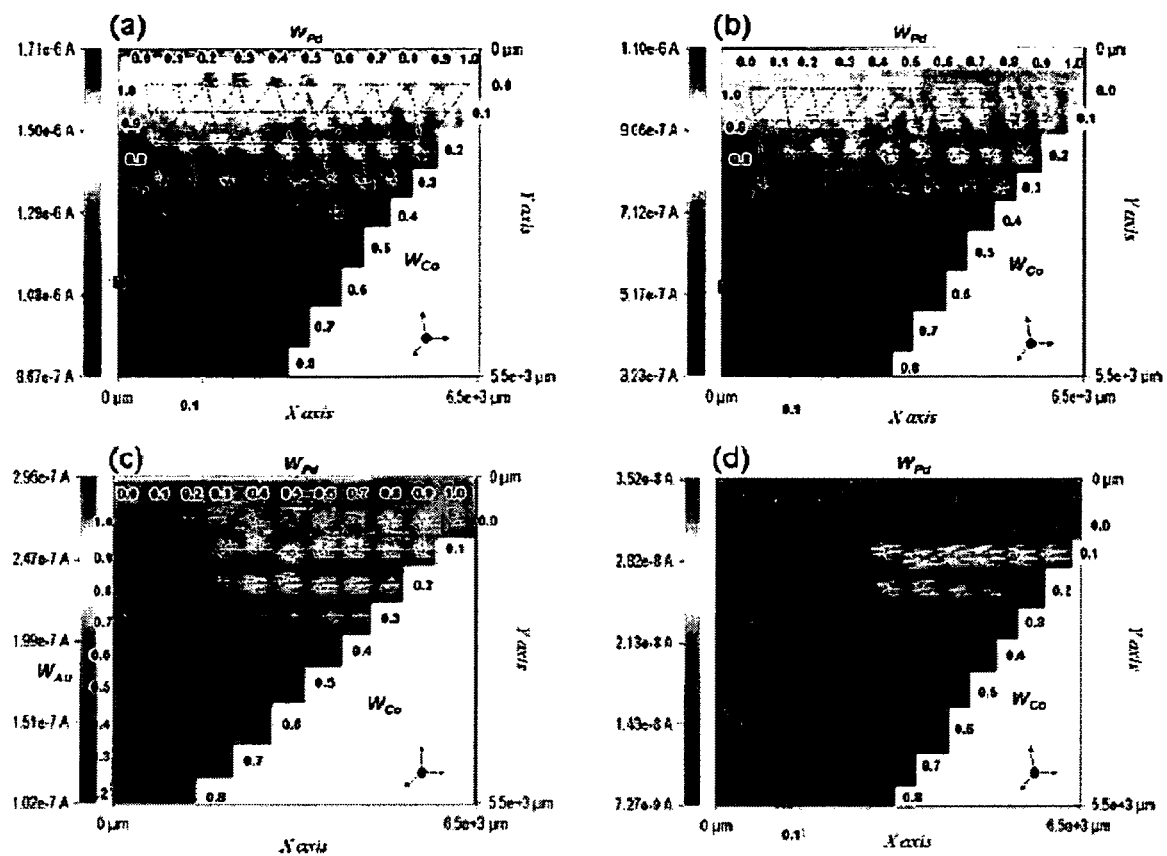
FIG. 8 is a SECM TG-SC image of oxygen reduction activity measured on Pd—Au—Co arrays.

In addition to bimetallic mixtures, the inventors contemplate trimetallic and multimetallic combinations as catalysts for $O_2$ reduction. FIG. 8 shows SECM images of an array containing combinations of Pd, Co and Au recorded at four different substrate potentials. At the least positive potentials a range of catalyst compositions containing large amounts of Pd showed good activity for oxygen reduction, while catalysts that have high Co contents did not exhibit any electrocatalytic activity. FIGS. 8(a)-8(d) are SECM TG-SC images of oxygen reduction activity measured on Pd—Au—Co arrays in about 0.5 M $H_2SO_4$. The tip-substrate distance was 30 μm, the tip current was about −160 nA, and the scan rate was about 50 μm each 0.2 seconds. FIG. 8(a) shows SECM images of an array containing an $E_S$ when compared to a HRE of 0.2 V. FIG. 8(b) shows SECM images of an array containing 0.4 volts. FIG. 8(c) shows SECM images of an array containing about 0.6 V. FIG. 8(d) shows SECM images of an array containing about 0.75 V. $W_M$ is the atomic ratio of metal M in the spot.

As the substrate potential is shifted to more positive potentials (e.g., about 0.7 volts), a smaller number of catalyst compositions retained electrocatalytic activity (typically Pd mixtures containing about 10% Co). At about 0.75 volts, the highest activity was observed for catalyst compositions containing about 70% Pd, 10% Co and 20% Au.

RDE Characterization. Using the SECM screening technique of the present invention identified a range of catalyst compositions that exhibit enhanced electrocatalytic activity when compared with the pure metals, even at relatively positive potentials. However, the appropriateness of rapid screening techniques to identify novel electrocatalytic materials has been questioned, since such screening techniques employing deposited arrays of metallic catalyst spots do not necessarily provide an accurate insight into the electrocatalytic performance of materials when immobilized on electrodes that approach true fuel cell configurations.[39]

Figure 9:
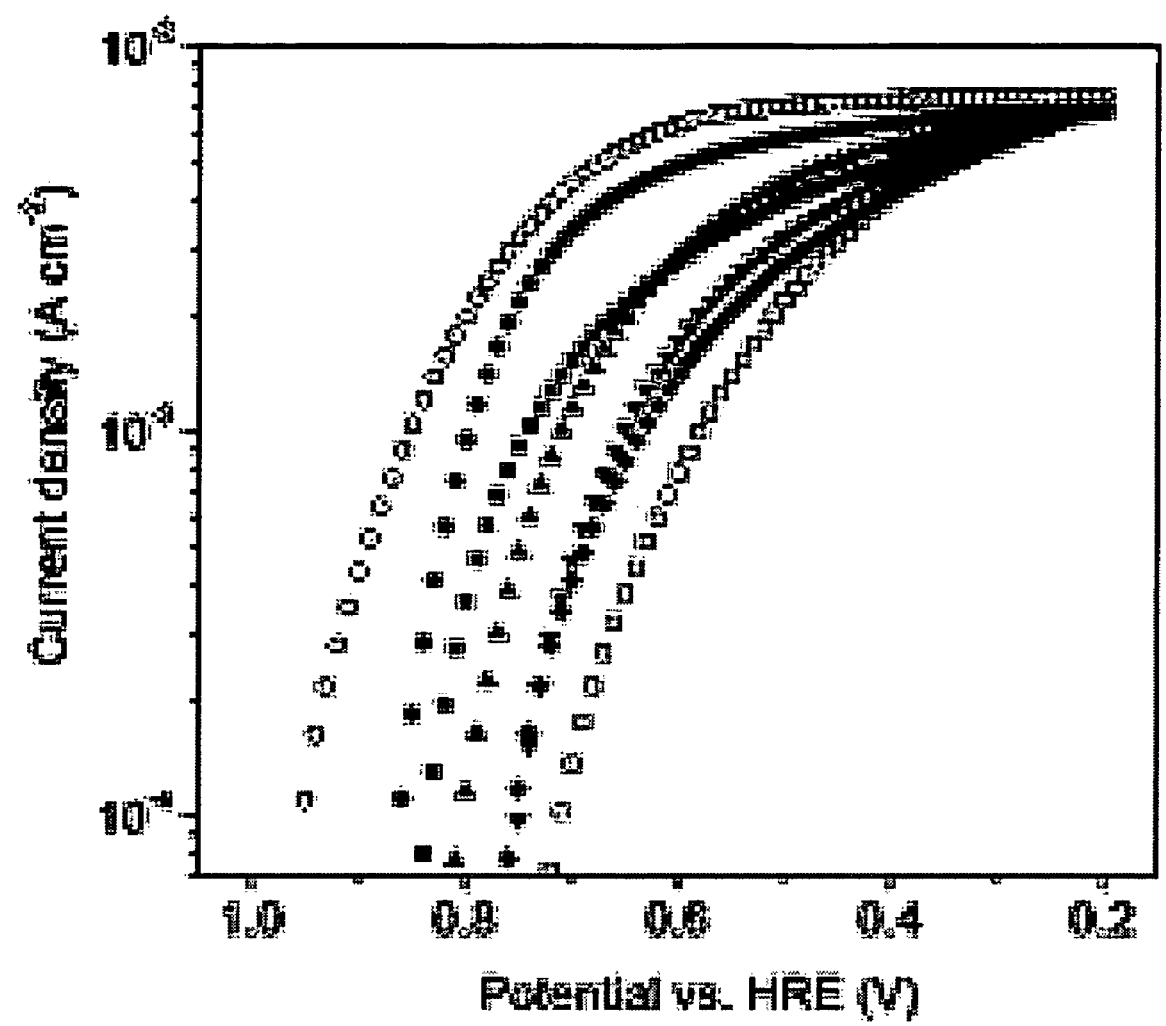
FIG. 9 is a plot of polarization curves measured by potentiodynamic scans of carbon black-supported Pd—Co RDE.

Classical RDE studies have been used to compare the electrocatalytic activities obtained with those observed using the SECM technique. FIG. 9 is a graph of polarization curves measured by slow potentiodynamic scans (e.g., about 10 mV $s^{-1}$) of carbon black-supported Pd—Co (e.g., about 20 weight percent) rotating disk electrodes in $O_2$-saturated (e.g., 1 atm) about 0.5 M $H_2SO_4$. Rotation rate: about 2000 rpm at % Pd=100 (□), 90 (■), 80 (•), 70 (▲), 60 (▼), 50 (♦) and carbon black supported Pt (e.g., about 20 weight percent) (○). FIG. 9 shows i-E curves obtained for a series of Pd—Co catalysts supported on carbon black. The onset potential for oxygen reduction at Pd clearly shifted in the positive direction upon addition f Co by about 0.2 V. A mixture of 80:20 Pd—Co clearly exhibited the highest activity, very close to the activity exhibited by Pt, as shown in the screening studies. However, the good performance of Pd—Co was lost after approximately 3 hours of continuous operation, as evidenced by a noticeable increase of the ORR overpotential (not shown).

Upon addition of 10% Au to the Pd—Co mixture, the stability was greatly improved and the electrode retained its high electrocatalytic activity.

Significantly, the agreement between RDE and SECM results is excellent. By comparing the activities determined by both techniques, the apparent high electrocatalytic activity of Pd—Co—Au observed in the SECM imaging is the result of the stabilizing effect of Au. The agreement between the observed enhancement of Pd—Co (e.g., SECM and RDE) with that previously observed using a voltammetric method[32] is remarkable, as the latter case, the catalysts were prepared by sputtering of the pure metals. In each of the three studies, the electrocatalytic material was prepared using a different approach, yet the synergetic effect of Co on Pd is apparent.

The present invention also includes a non-platinum electrocatalysts for ORR involves the metal oxide route to reduce oxygen (i.e., the direct four-electron route), which involves closely pairing two or more metals together, in which one metal (M), provides good oxygen-bond cleaving ability for first splitting the oxygen-oxygen bond of molecular oxygen while the second metal (M'), or a combination of other metals, (M') and (M''), provides good electroreducing properties to convert the resulting atomic oxygen efficiently to water:

$$2M + O_2 \leftrightarrows 2MO \quad (4)$$

$$2MO + 2M' \leftrightarrows 2M'O \quad (5)$$

$$2M'O + 4H^+ + 4e^- \leftrightarrows 2M' + 2H_2O \quad (6)$$

The metals were chosen based on the Gibbs free energies of the metal oxide formation (reaction 4) and the standard potential for the electrochemical reduction of metal oxide (reaction 5) as described earlier.[43] Rapid screening of selected metal combinations (e.g., Pd with Co, Au, and Ti) over a wide range of compositions using SECM to identify the metal combinations with optimum compositions that exhibit good activity for ORR. An array of bimetallic or trimetallic catalyst spots with different compositions were deposited on a glassy carbon (hereafter referred to as "GC") support. A small ultramicroelectrode tip is used to generate oxygen at a constant current as the tip is scanned above the array of spots, with the GC held at different potentials, so that each spot registers a current proportional to the rate of oxygen reduction at that location (e.g., GC, which is a poor oxygen reduction catalyst, does not produce a significant response at these potentials).

Figure 10:
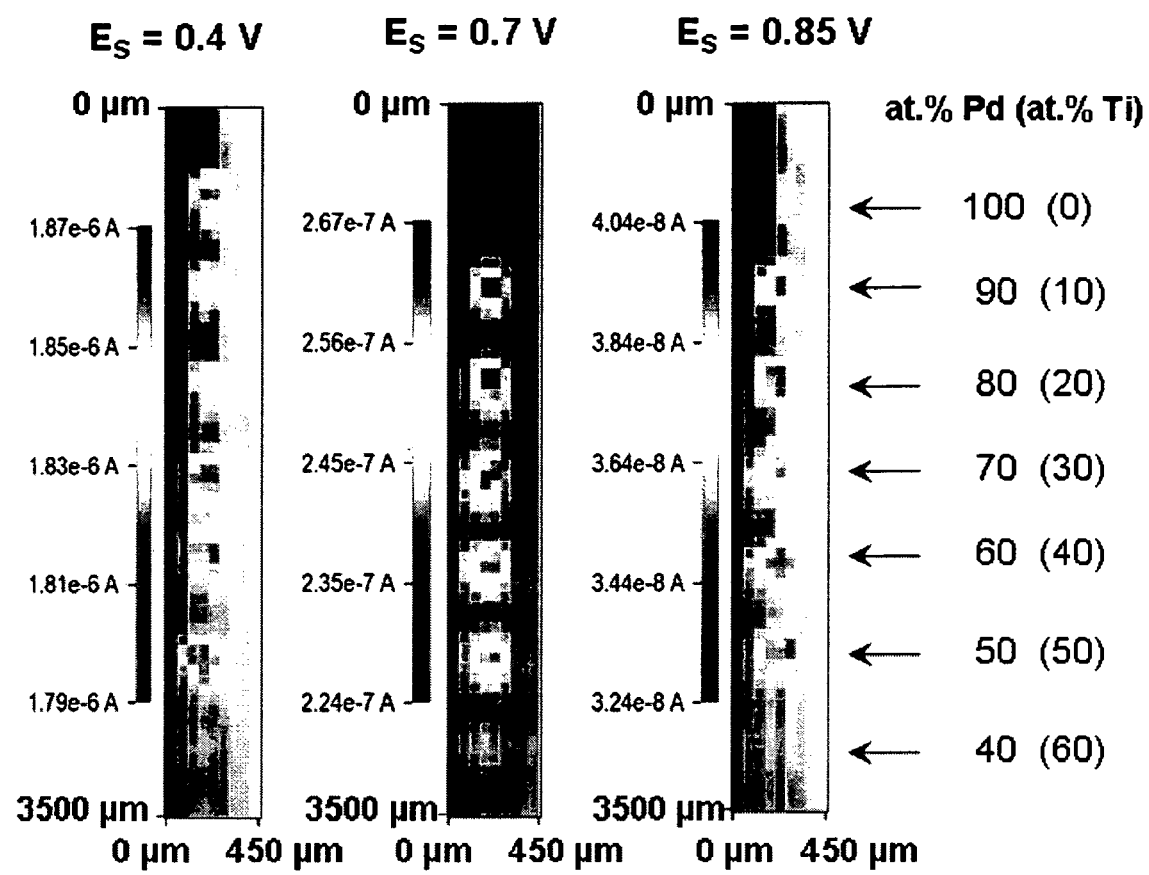
FIG. 10 is a SECM TG-SC image of oxygen reduction activity measured on a binary Pd—Ti array in 0.5 M $H_2SO_4$.

FIG. 10 is an SECM image of oxygen reduction activity measured for an array of binary Pd—Ti spots of different compositions at different potentials in about 0.5 M $H_2SO_4$. The images correspond to the ratio of Pd to Ti which ranged from 100:10 to 40:60 at different $E_S$. The spot array was scanned with about a 25 μm tip generating oxygen above an array of different compositions at different potentials. The tip-substrate distance was about 30 μm, the tip current was about −171 nA, and scan rate was about 50 μm each 0.2 seconds. Potentials were measured against the hydrogen reference electrode. The screening by SECM identified Pd-based compositions (e.g., Pd—Co—Au at about 70:20:10 atom %) and Pd—Ti (e.g., about 50:50 atom %) as those exhibiting catalytic activity for the ORR.

While such screening techniques are useful in identifying candidate materials, tests more closely related to the fuel cell operating conditions (e.g. supports, preparation conditions) are required to demonstrate electrocatalytic performance. Therefore, the identified compositions were then prepared on a carbon support, with a metal loading of about 20 weight percent, by a reverse microemulsion route for the Pd—Co—Au ternary system (referred to as "Pd—Co—Au/C" hereafter) and an impregnation method for the Pd—Ti binary system (referred to as "Pd—Ti/C" hereafter) and optimized by heat treatments in a flowing reducing atmosphere including about 90% Ar and about 10% $H_2$ to improve the cathode performance in PEMFC.

Figure 11:
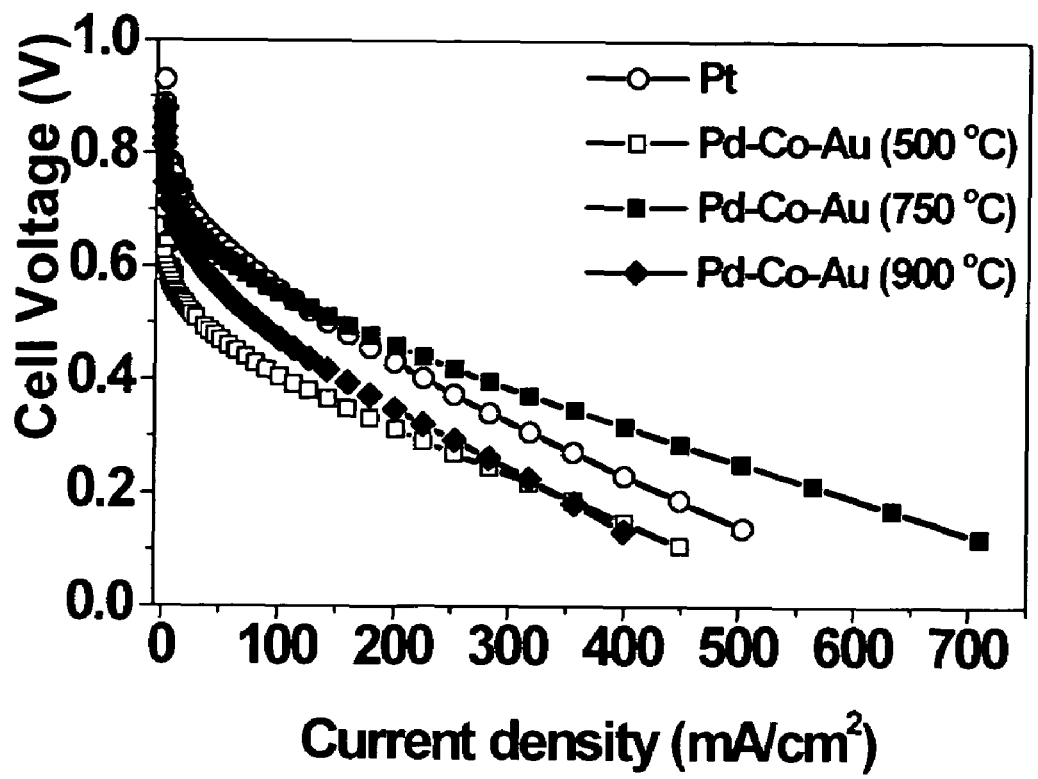
FIG. 11 is a graph of steady-state polarization curves of the various heat treated carbon supported Pd—Co—Au and Pd—Ti catalysts.
Figure 11:
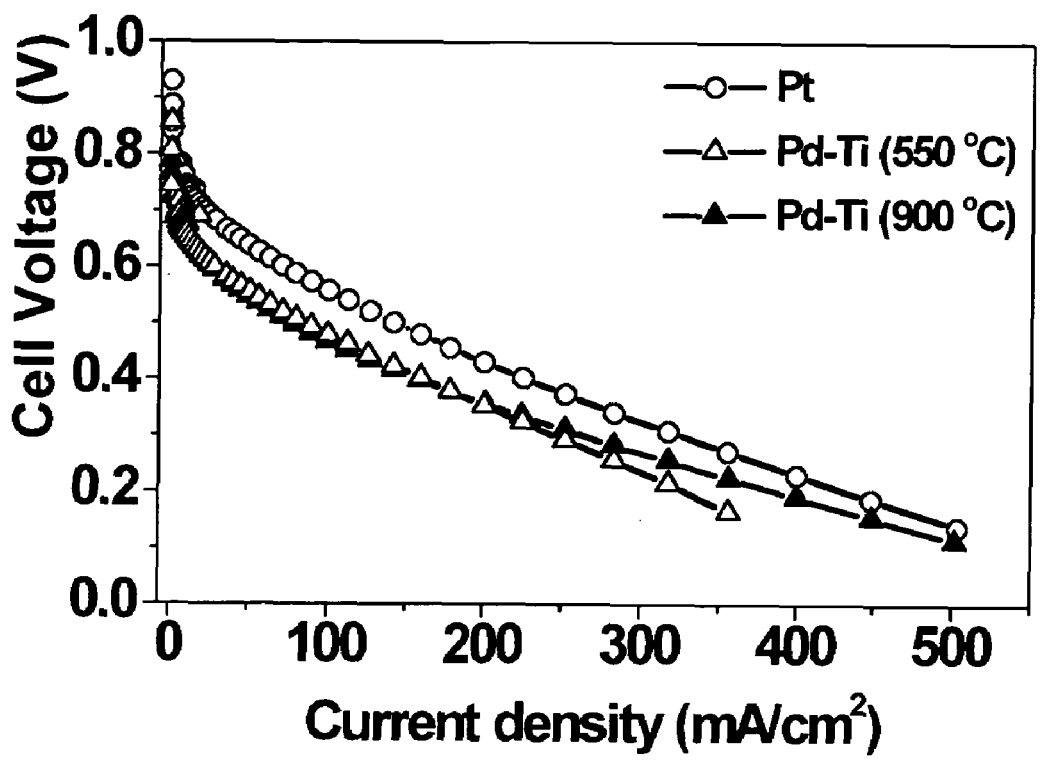

The performances of the membrane electrode assemblies (hereafter referred to as "MEAs") in PEMFC with the Pd-based catalysts (e.g., Pd—Co—Au/C and Pd—Ti/C) as cathodes, commercial Pt/C (e.g., about 20 weight percent platinum on carbon, Johnson Matthey) as anodes, and Nafion 115 as electrolyte were evaluated in a single cell PEMFC. FIG. 11 is a graph of the cell voltage verses the current density. Comparison of steady-state polarization curves of the various heat treated carbon supported Pd—Co—Au (e.g., Pd:Co:Au ratio of 70:20:10 atom %) and Pd—Ti (e.g., Pd:Ti ratio of about 50:50 atom %) catalysts for ORR in single cell PEMFC with that of a commercial (Johnson-Matthey) Pt catalyst at about 60° C. with a metal(s) loading of about 0.2 mg/cm². The data was collected with Nafion 115 membrane, Pt anode catalyst loading of about 0.2 mg/cm², humidifier temperature of about 60° C., and a hydrogen and oxygen pressures of, respectively, about 18 and about 20 psi.

For a comparison, a commercial sample of platinized carbon (e.g., about 20 weight percent platinum on carbon, Johnson Matthey) was also examined as a cathode. The Nafion 115 electrolyte was sandwiched between the cathode and anode by hot pressing. Both the Pd—Co—Au/C catalyst heat treated at about 750° C. and the Pd—Ti/C catalyst heat treated at about 900° C. exhibited performances that are remarkably equal or better than that of commercial platinum catalysts of the same loading. The about 750° C. Pd—Co—Au/C and about 900° C. Pd—Ti/C catalysts showed open circuit voltages of about 0.89 V, which is close to that found with commercial platinum catalysts.

Figure 12:
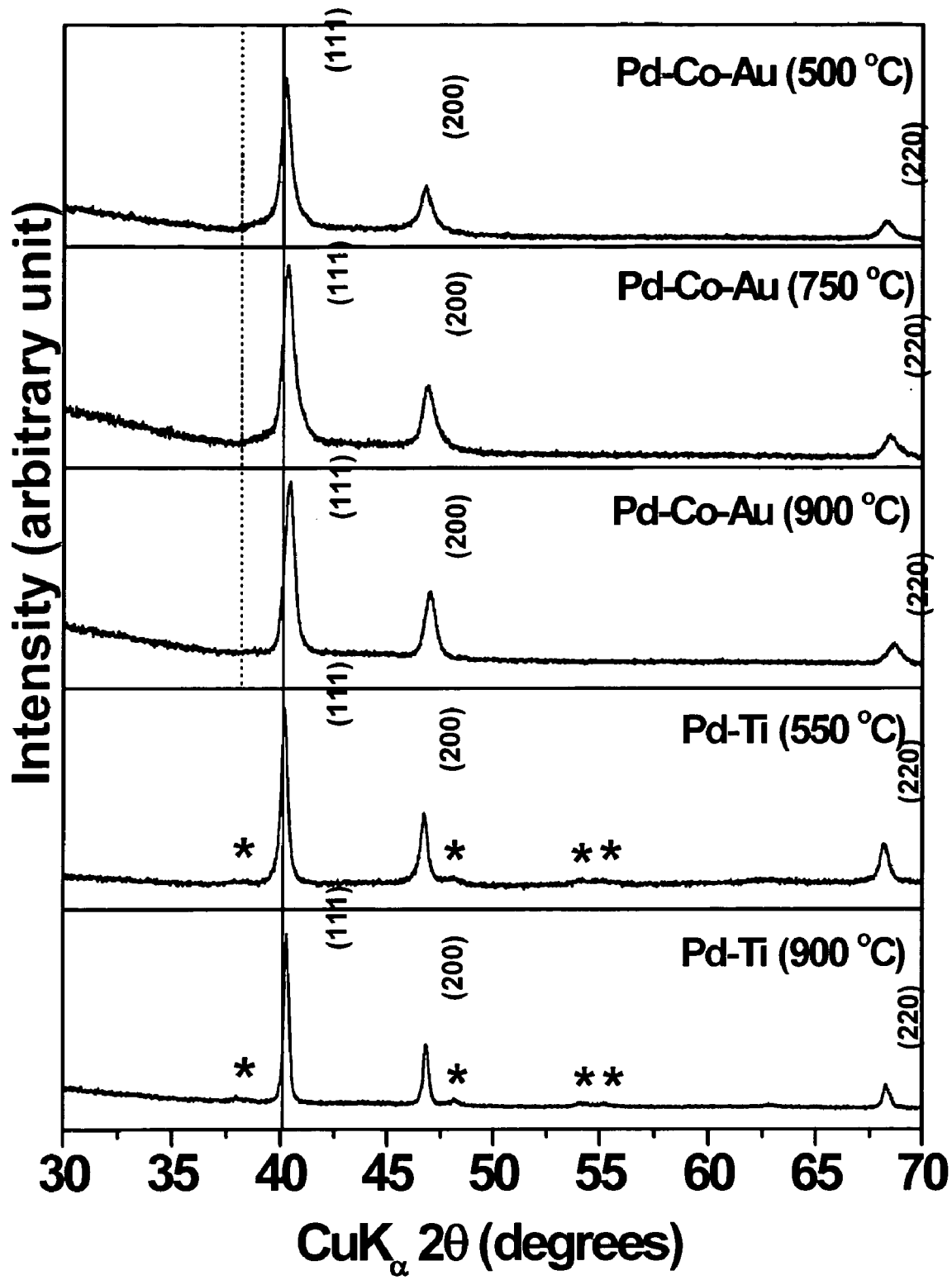
FIG. 12 is an X-ray diffraction pattern of Pd—Co—Au and Pd—Ti before and after heat treating at various temperatures.

FIG. 12 is an X-ray diffraction plot of the structure of the electrodes. The Pd—Co—Cu sample heat treated at about 500° C. shows well-defined reflections corresponding to a face centered cubic (FCC) phase. The shifting of the reflections to higher angles compared to those expected for pure Pd metal and the absence of reflections corresponding to pure Au or Co suggests an alloying of Pd with Co and Au. The reflections shift further to slightly higher angles on heating the sample at about 750 and about 900° C., suggesting a slight improvement in the extent of alloying. The Pd—Ti/C sample heat treated at about 550° C. shows reflections corresponding to predominantly an FCC phase with a slight shift of the reflections to higher angles compared to those expected for Pd metal and a small amount of $TiO_2$. The shifting of the reflections to higher angles increases slightly on heating at about 900° C., suggesting an increase in the extent of alloying with Ti and a further contraction of the lattice. The crystallite sizes estimated from the XRD data using Scherer's equation were in the range of about 12-15 and about 24-33 nm, respectively, for the heated treated Pd—Co—Au/C and Pd—Ti/C samples.

Comparing the electrochemical performances in FIG. 11, the 750° C. Pd—Co—Au/C sample exhibits higher catalytic activity than the 500 and 900° C. Pd—Co—Au/C samples. Both the electronic factors arising from alloy content and geometric factors arising from particle size are known to influence the chemisorption behavior of oxygenated species and the catalytic activity for ORR.[42,44] The decrease in catalytic activity on going from the 750 to the 900° C. sample could be due to the increase in particle size and the consequent decrease in the electrochemically active surface area. On the other hand, the lower catalytic activity of the 500° C.

sample compared to the 750° C. sample could be due to the lower degree of alloying of Pd with Co and Au as indicated by the XRD data in FIG. 12.

Figure 13:
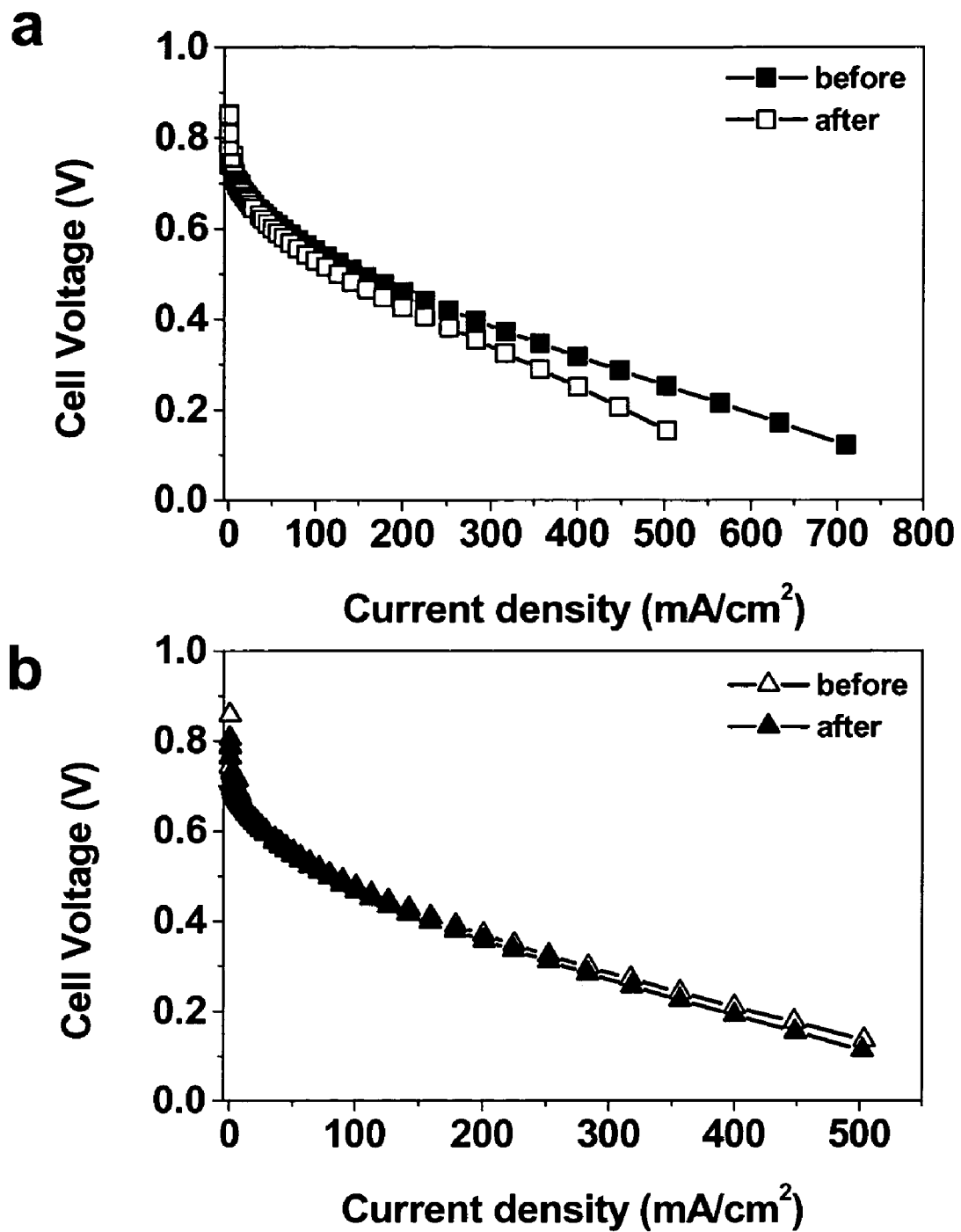
FIG. 13 is a graph of steady-state polarization curves voltage verses density.

FIG. 13 is a graph of cell voltage verses current density for the 750° C. Pd—Co—Au/C and 900° C. Pd—Ti/C cathodes by recording the polarization curves before and after polarization. The cell with Pd—Ti/C cathode showed essentially stable performance within the test period of about 12 hours, while that of the Pd—Co—Au/C sample degraded, indicating the former is more stable than the latter. The lower stability of Pd—Co—Au/C could be related to the possible leaching of Co in the fuel cell environment, as has been suggested with Pt—Co catalysts.[41] Comparison of the steady-state polarization curves of the carbon supported Pd—Co—Au catalysts with various Au contents (after heat treating at 500° C.) for ORR in single cell PEMFC with that of a commercial (Johnson-Matthey) Pt catalyst at 60° C. with a metal(s) loading of about 0.2 mg/cm$^2$. The data were collected with Nafion 115 membrane, Pt anode catalyst loading of about 0.2 mg/cm$^2$, humidifier temperature of about 60° C., and a hydrogen and oxygen pressures of, respectively, about 18 and about 20 psi. The Pd—Co/C catalyst shows poor performance compared to the Au incorporated Pd—Co—Au/C samples, suggesting that the incorporation of Au improves the ORR activity significantly. However, the electrocatalytic activity depends on the amount of Au in the sample. The Pd—Co—Au sample with about 10-atom percent Au shows the best performance with low polarization loss similar to that of a commercial Pt catalyst.

Figure 14:
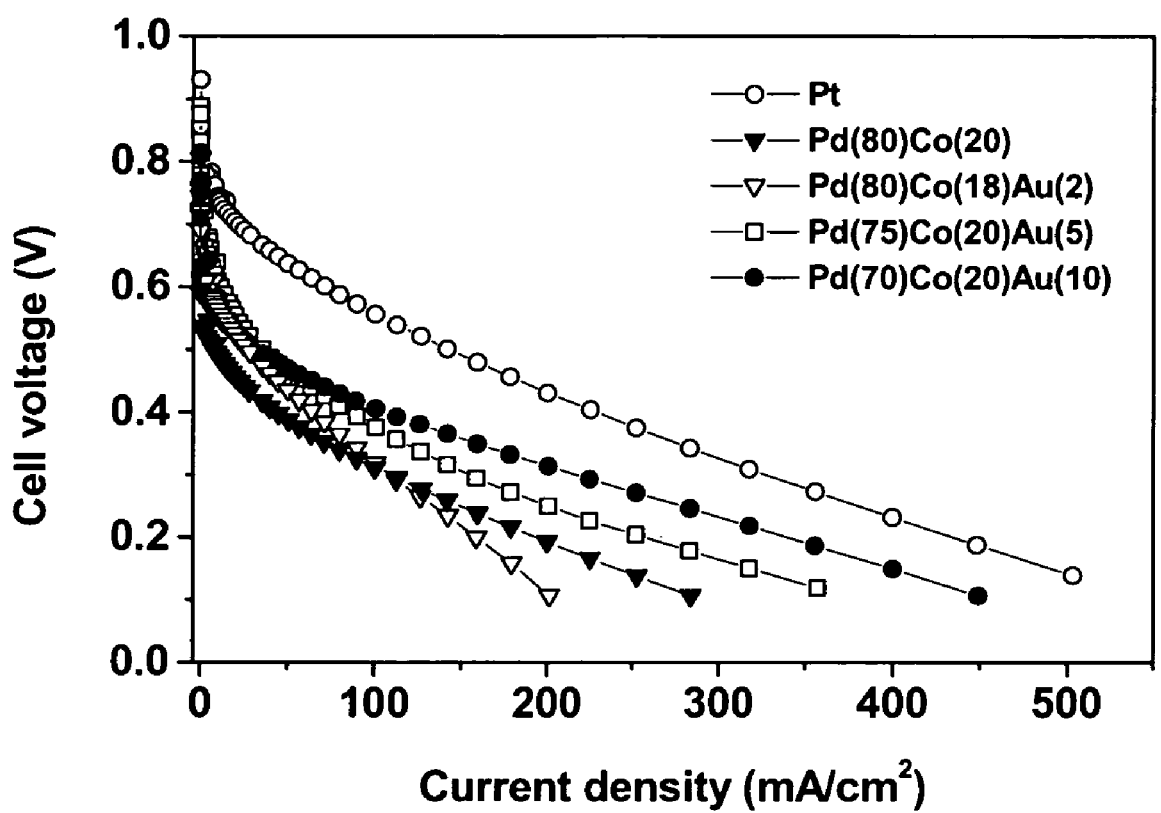
FIG. 14 is a comparison of steady-state polarization curves of the carbon supported catalysts.

To determine the essentiality of Au on the catalytic activity for ORR, the electrochemical performances of the Pd—Co—Au/C catalysts with different Au contents (between about 0 to 10 atom percent) were compared after heat treatment at about 500° C. With reference to FIG. 14 a graphic comparison of the steady-state polarization curves of the carbon supported Pd—Co—Au catalysts with various Au contents (after heat treating at 500° C.) for ORR in single cell PEMFC with that of a commercial (Johnson-Matthey) Pt catalyst at 60° C. with a metal(s) loading of 0.2 mg/cm$^2$. The data were collected with Nafion 115 membrane, Pt anode catalyst loading of 0.2 mg/cm$^2$, humidifier temperature of 60° C., and a hydrogen and oxygen pressures of, respectively, 18 and 20 psi. The Pd—Co/C catalyst shows poor performance compared to the Au incorporated Pd—Co—Au/C samples, suggesting that the incorporation of Au improves the ORR activity significantly. However, the electrocatalytic activity depends on the amount of Au in the sample. The Pd—Co—Au sample with 10-atom % Au shows the best performance with low polarization loss similar to that of a commercial Pt catalyst.

In direct methanol fuel cells (DMFC), the oxidation of methanol that crosses into the cathode compartment of the fuel cell causes a significant polarization loss in the ORR on Pt-based cathodes. Therefore, the tolerance of the cathode catalysts to the methanol oxidation in the cathode compartment is critical to achieving better cell performance and operational life in the DMFC. A cyclic voltammetric characterization of the Pt/C, Pd—Co—Au/C, and Pd—Ti/C catalysts in 1 M H$_2$SO$_4$, both with and without methanol, indicates that the methanol oxidation current densities on the Pd-based catalysts (Pd—Co—Au/C and Pd—Ti/C) are significantly lower or even negligible compared to that on the Pt/C catalyst.

Figure 15:
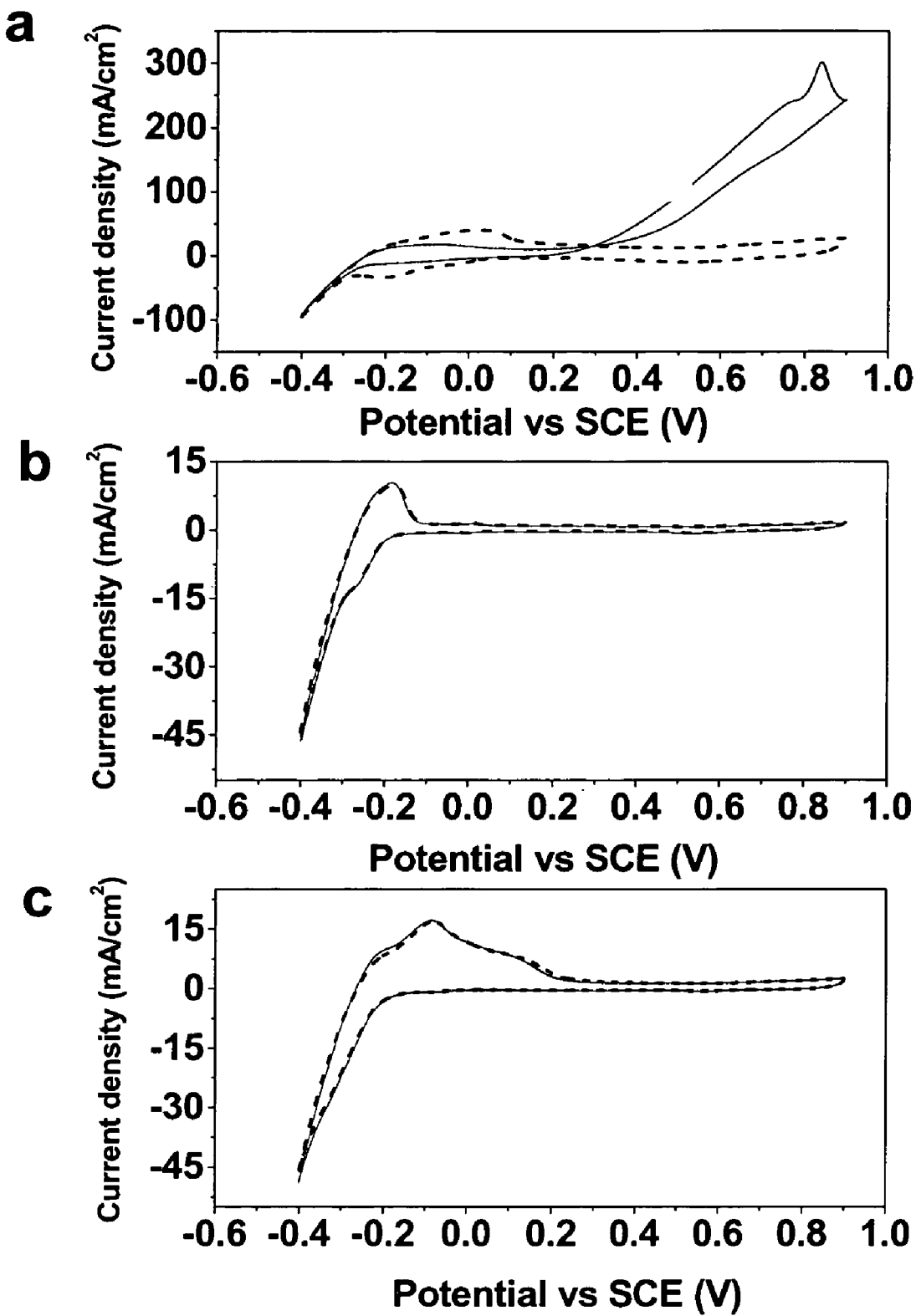
FIG. 15 is a cyclic voltammogram of Pt catalyst, Pd—Co—Au catalyst and Pd—Ti catalyst.

FIG. 15 is a cyclic voltammogram. The cyclic voltammogram (e.g., a graph of current density against potential) is recorded in 1 M H$_2$SO$_4$ in the absence (----) and presence (-) of 1 M methanol with a scan rate of about 25 mV/s at about 25° C.: FIG. 15(a) commercial Pt, FIG. 15(b) 750° C. Pd—Co—Au, and FIG. 15(c) 900° C. Pd—Ti. Unlike the Pt catalyst, the Pd—Co—Au and Pd—Ti samples do not show any activity for methanol oxidation, indicating that the Pd-based electrocatalysts are more tolerant to methanol. Thus, Pd—Co—Au/C and Pd—Ti/C cathodes would not only lower the cost but also enhance the performance of conventional direct methanol fuel cells.

Significantly, the agreement between RDE and SECM results is excellent. By comparing the activities determined by both techniques, high electrocatalytic activity of Pd—Co—Au observed in the SECM imaging is attributed to a stabilizing effect of Au. The agreement between the observed enhancement of Pd—Co (by SECM and RDE) with that previously observed using a voltammetric method[32] is remarkable, especially since, in the latter case, the catalysts were prepared by sputtering of the pure metals. In each of the three studies, the electrocatalytic material was prepared using a different approach, yet the synergetic effect of Co on Pd is apparent.

The present invention provides non-platinum alloy compositions that offer catalytic activity similar to that of platinum. The finding opens a new avenue in the fuel cell area with broad fundamental and applied scientific implications. Comparison of the electrochemical properties of these new non-platinum alloy catalysts with that of Pt may also help to develop a better understanding of the mechanisms involved in the oxygen reduction reactions. The significantly lower cost of the Pd—Co—Au and Pd—Ti catalysts and the relative abundance of Pd, Au, and Ti compared to that of Pt can enhance the commercial viability of the fuel cell technology. Moreover, in preliminary studies, these new oxygen-reduction catalysts are found to be relatively more tolerant to methanol than the Pt catalyst, which could have a significant impact in the direct methanol fuel cell technology as well.

Platinum supported on carbon black is widely used as the electrocatalyst for oxygen reduction reaction (ORR) in proton exchange membrane fuel cells (PEMFC) due to its high catalytic activity and chemical stability in the fuel cell environment. However, platinum is expensive and the limited supply of platinum poses serious problems for a widespread commercialization of the fuel cell technology. These difficulties have created enormous interest in the search for less expensive, more efficient electrocatalysts as well as in lowering the catalyst loading.[45,53] With respect to identifying alternative electrocatalysts, non-platinum based metal combinations,[54,57] metal oxides,[58,60] carbides,[61] chalcogenides,[62,63] enzymes,[64,65] inorganic and organometallic complexes,[66,67] and porphyrins have been investigated over the years for ORR, but they generally exhibit lower catalytic activity than Pt.

Some palladium based electrocatalysts (e.g., Pd—Co—Au and Pd—Ti) that show essentially equal or slightly better performance than Pt for ORR in PEMFC at 60° C.[68] The initial identification of these metal combinations employing scanning electrochemical microscopy (SECM) was based on thermodynamic principles recently reported by Fernandez et al.[69] that involves the pairing of a good oxygen-bond cleaving metal with a good oxygen-reducing metal.[69] However, the Pd—Co—Au catalyst was found to degrade after polarizing the cell at 200 mA/cm$^2$ for 12 hours, while the Pd—Ti catalyst was stable.[68] On the other hand, the Pd—Co—Au system showed slightly better performance than the Pd—Ti system in PEMFC. With an aim to improve the stability of the Co-containing system while maximizing the electrochemical performance, the present inventors recognized that other metal combination (e.g., Pd—Co—Mo (70:20:10 atom %))

may exhibit not only better performance than Pt for ORR in PEMFC, but also good stability and better tolerance to methanol.

The carbon supported Pd—Co—Mo ternary catalysts with a metal loading of about 20 wt % was prepared by reducing the Pd and Co precursors with sodium borohydride in the presence of the carbon support to form first Pd—Co/C followed by Mo incorporation by an impregnation method. To prepare Pd—Co/C, required amounts of ammonium hexachlororpalladate (Aldrich, Milwaukee, Wis.) and cobalt nitrate (Aldrich) were added into a constantly stirring suspension of Vulcan XC-72R carbon black in deionized water and the mixture was agitated in an ultrasonic bath for about 30 minutes. A few drops of 1 M NaOH solution were then added to this mixture to raise the pH to about 10 before adding about 5 wt % sodium borohydride. The resulting reaction mixture was stirred for about 15 minutes, left standing overnight, filtered, washed with deionized water, and dried in air to form Pd—Co/C. To a known amount of Pd—Co/C thus obtained, the required amount of ammonium heptamolybdate (Aldrich) solution was added, ultrasonicated for about 30 minutes and the solvent was evaporated on a hot plate. The product was subsequently heat treated at various temperatures in a flowing about 90% Ar— about 10% $H_2$ atmosphere to form the Pd—Co—Mo alloy catalyst. Compositional analysis of the Pd—Co—Mo/C samples by energy dispersive X-ray spectroscopic (EDXS) analysis and X-ray photoelectron spectroscopy (XPS) indicated the composition to be very close to the nominal value.

Figure 16:
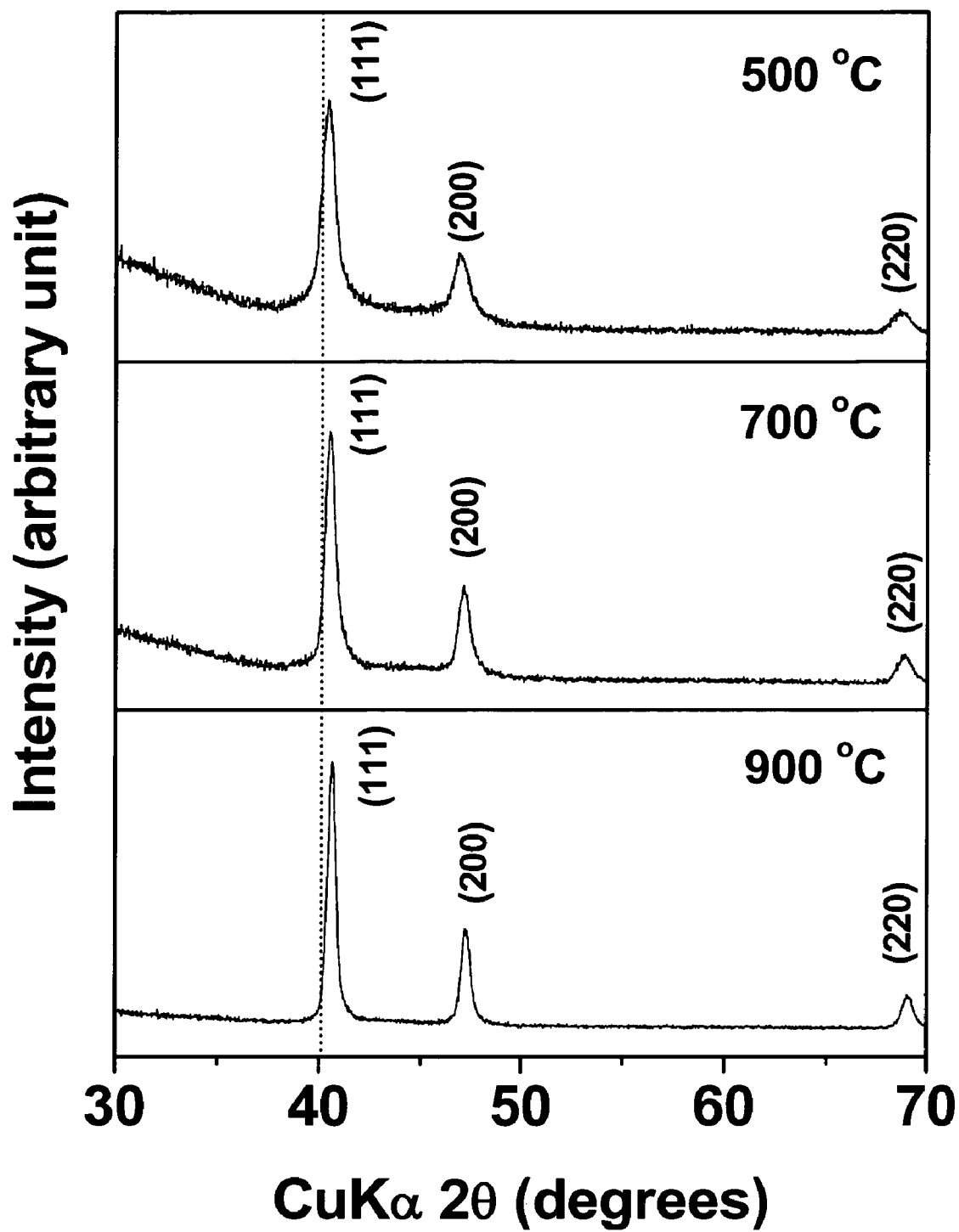
FIG. 16 is a graph that compares the X-ray diffraction patterns of the Pd—Co—Mo/C.

FIG. 16 is a graph that compares the X-ray diffraction patterns of the Pd—Co—Mo/C (Pd:Co:Mo =70:20:10 atom %) catalysts after heat treating at various temperatures in 90% Ar— 10% $H_2$ at various temperatures. The dotted line refers to the standard 2θ value corresponding to the (111) reflection of Pd metal. The diffraction peaks are characteristic of a face-centered cubic (FCC) lattice, but the reflections are shifted to higher angles compared to that of Pd metal, indicating a contraction of the lattice due to alloy formation. Table 1 illustrates the extent of shifting increases and the lattice parameter decreases with increasing heat treatment temperature, suggesting an increase in the degree of alloying. Although no reflections corresponding to bulk oxides of Co and Mo are seen, their presence may not be completely ruled out due to smaller quantity and possibly poor crystallinity.

active surface area decreases with increasing heat treatment temperature for the Pd—Co—Mo alloy due to the increase in crystallite size and the values are smaller than that for the commercial pt catalyst due to the much smaller crystallite size of Pt.

The gas diffusion electrodes for testing in single cell PEMFC were prepared as follows: The gas-diffusion layer was made by spraying a mixture consisting of carbon black powder (Vulcan XC-72R), about 40 wt % polytetrafluoroethylene (PTFE), and a solvent (mixture of water and isopropyl alcohol) onto a teflonized carbon cloth and drying in vacuum at about 300° C. for about 2 hours. On top of this gas diffusion layer, the catalyst layer was deposited by spraying a mixture consisting of required amount of the carbon-supported metal(s) catalyst, solvent (e.g., a mixture of water and isopropyl alcohol), and about 33 wt % Nafion, followed by sintering in vacuum at about 90° C. for about 1 hour. All the electrodes had a uniform catalyst metal loading of about 0.2 mg/cm². The membrane-electrode assembly (MEA) was obtained by sandwiching the Nafion 115 membrane between the cathode and anode (about 20 wt % Pt on carbon, Johnson Matthey) by hot pressing. The fuel cell testing was carried out at an operating temperature of about 60° C. with a hydrogen and oxygen pressures of, respectively, about 18 and about 20 psi and a humidifier temperature of about 60° C.

Figure 17:
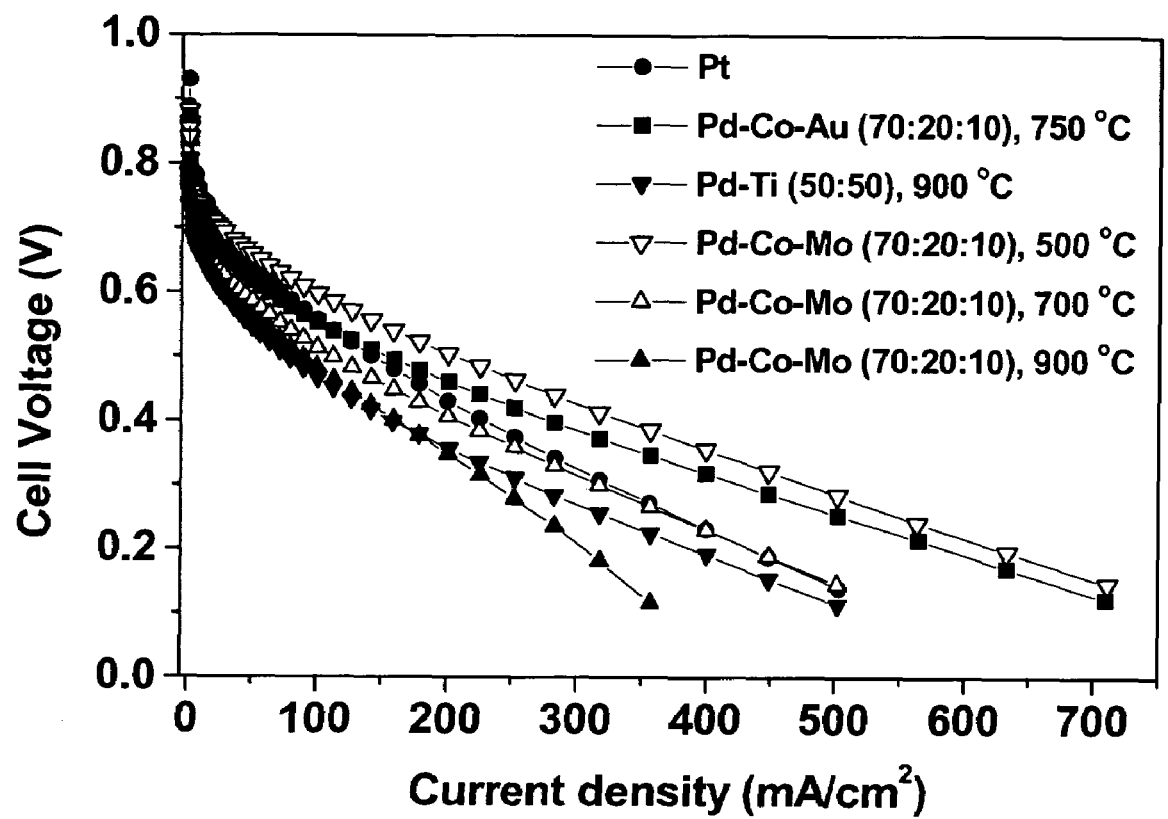
FIG. 17 is a graph of the polarization curves which are defined as the current per unit surface area of the catalyst.

FIG. 17 compares the electrochemical performances in single cell PEMFC of the Pd—Co—Mo/C (Pd:Co:Mo =70:20:10 atom %) cathode catalysts with those of commercial Pt/C (20 wt % Pt on carbon, Johnson Matthey) and Pd—Co—Au and Pd—Ti cathodes.[68] The Pd—Co—Mo/C catalyst heat treated at 500° C. exhibits better performance with lower polarization loss than the commercial Pt and our previously reported Pd—Co—Au and Pd—Ti catalysts at the same loading. Pd—Co—Mo/C shows an open circuit voltage of about 0.9 V, which is close to that found with the commercial Pt catalyst. The specific activities (mA/m² of metal/alloy) are given in Table 1.

FIG. 17 is a graph that illustrates the polarization curves which are defined as the current per unit surface area of the catalyst at about 0.7 V. The 500 and 700° C. treated Pd—Co—Mo samples show better specific activity for ORR than the commercial Pt. With the Pd—Co—Mo alloy, the specific

TABLE 1

| Catalyst | Heat treatment temperature (° C.) | Lattice parameter (nm) | Crystallite size (nm) | Surface area (m²/g) | Specific activity (mA/m² catalyst) at 0.7 V |
|---|---|---|---|---|---|
| Pd[a] | — | 0.3879 | — | — | — |
| Pd—Co—Mo (70:20:10) | 500 | 0.3862 | 24 | 22 | 0.9 |
| Pd—Co—Mo (70:20:10) | 700 | 0.3850 | 31 | 17 | 0.8 |
| Pd—Co—Mo (70:20:10) | 900 | 0.3844 | 42 | 13 | 0.3 |
| Commercial Pt (Johnson Matthey) | As-received | 0.3921 | 3.8 | 74 | 0.4 |

The alloy crystallite size as derived from the x-ray data using the Scherer equation increases with increasing temperature (e.g., Table 1). The active surface area values calculated using the equation s=about 6000/rd (where r is the crystallite size in nm obtained from x-ray data and d is the density of the metal/alloy) are given in table 1; the density values used are about 21.5 and about 11.2 g/cm³, respectively, for Pt and Pd—Co—Mo (e.g., about 70:20:10 atom %). The activity decreases with increasing heat treatment temperature due to an increase in crystallite size and a consequent decrease in the active surface area (see e.g., Table 1). However, the increase in heat treatment temperature provides an important advantage of increasing the degree of alloying as indicated by the X-ray diffraction data and lattice parameter values. Therefore, synthetic approaches that can give a high degree of alloying and homogeneity at lower temperatures while keeping the crystallite size small have the possibility of improving the catalytic activity beyond what is seen in FIG. 17.

Furthermore, the electrochemical performance also depend strongly on the membrane-electrode assembly (MEA) fabrication procedures and parameters such as hot-pressing temperature and pressure and catalyst ink composition. Although, the performance of the commercial Pt catalyst may be lower compared to that in some literature reports. The MEA fabrication procedure and parameters are the same for all the samples in FIG. 17, which allows a clear comparison of the new Pd—Co—Mo catalyst with the well-known Pt catalyst.

Figure 18:
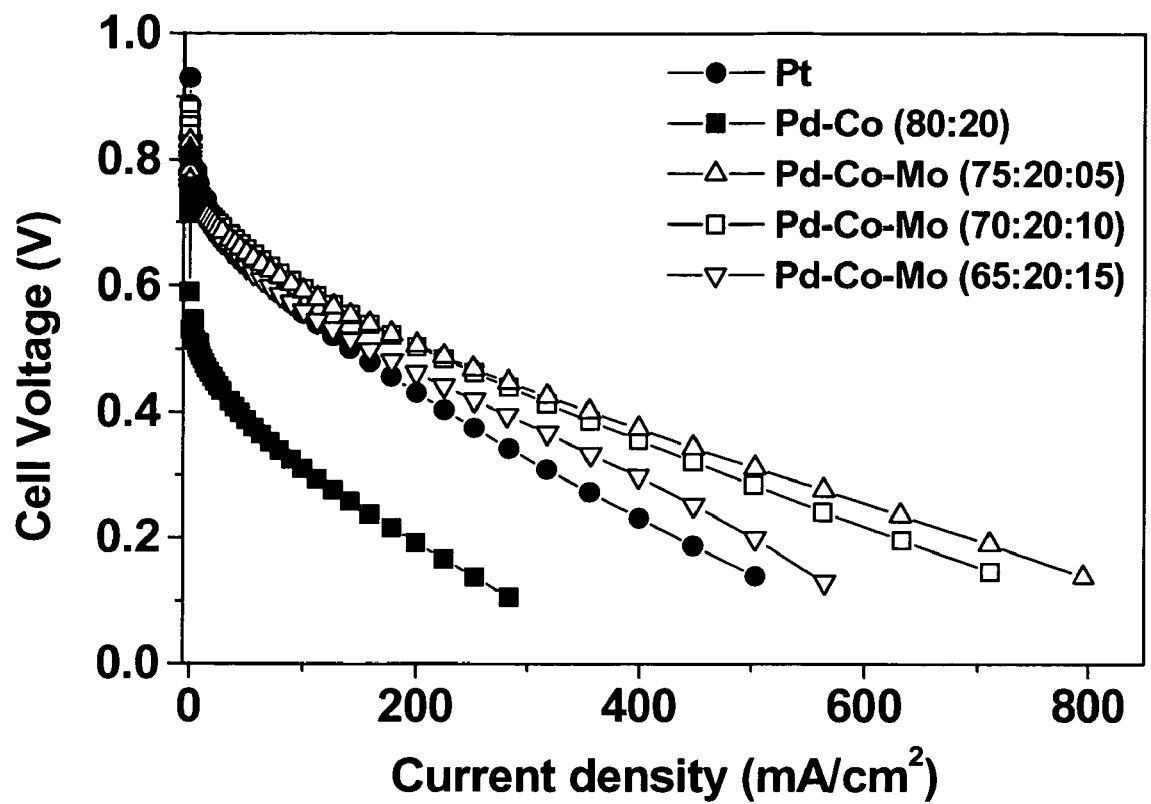
FIG. 18 is a graph comparing the steady-state polarization curves of the carbon supported Pd—Co—Mo catalysts with various ratios.

Pd—Co—Mo catalysts with different Pd:Co:Mo ratios were prepared and evaluated their performance as cathode in single cell after heat treating at 500° C. FIG. 18 is a graph comparing the steady-state polarization curves of the carbon supported Pd—Co—Mo catalysts with various Pd:Co:Mo ratios after heat treating at about 500° C. for ORR in single cell PEMFC at about 60° C. with that of commercial Pt catalyst with a metal(s) loading of about 0.2 mg/cm$^2$. The current density values are with respect to electrode geometrical area. The samples with Pd:Co:Mo =about 70:20:10 and about 75:20:05 atom % exhibit higher catalytic activity than the Pd:Co =about 80:20 sample without Mo and the Pd:Co:Mo =about 65:20:15 sample, suggesting that an optimum Mo content of about 5 to 10 offers the highest catalytic activity.

Figure 19:
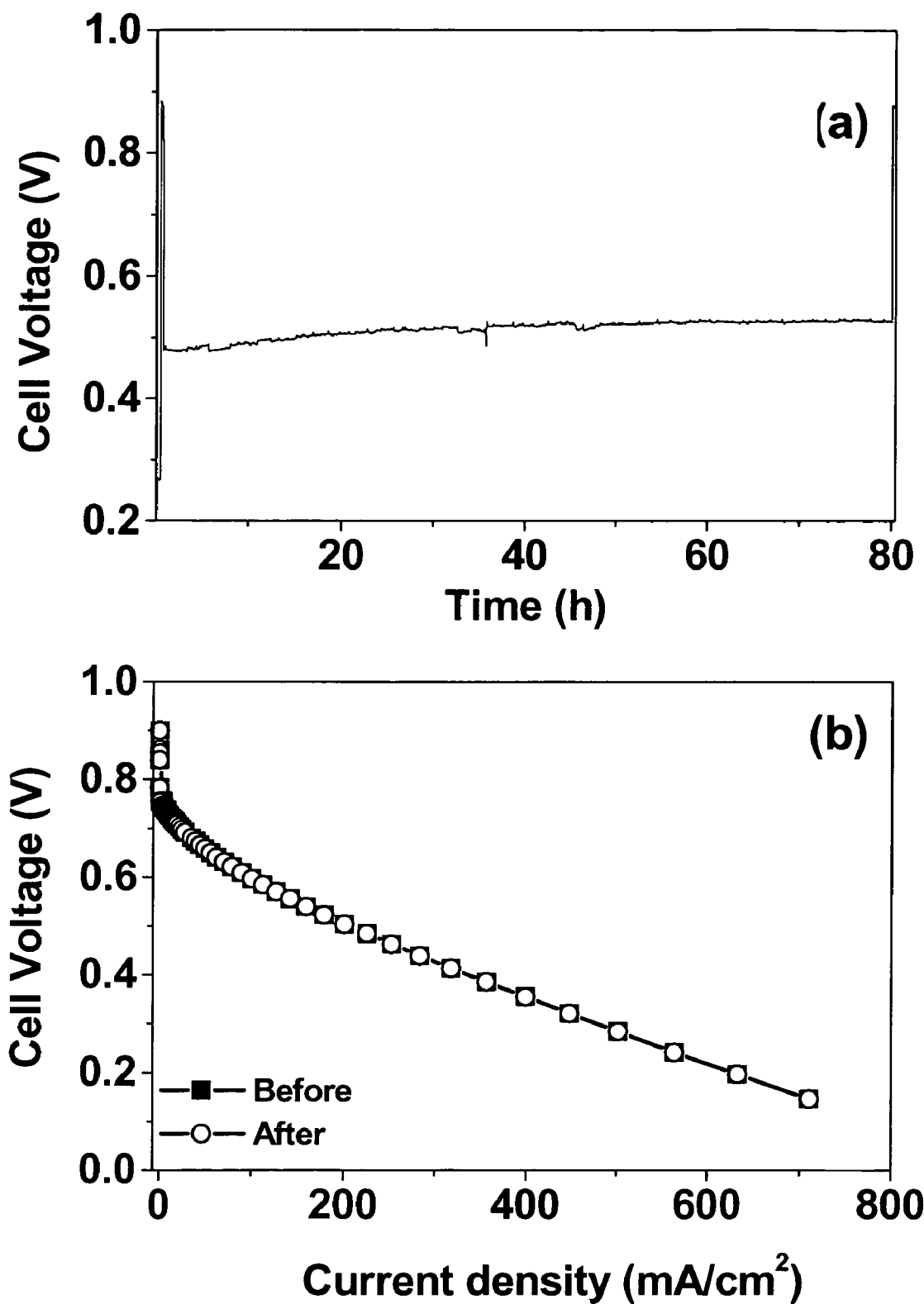
FIG. 19a is a graph illustrating the cell voltage variation during the time of polarization.
FIG. 19b is a graph that illustrates the steady-state polarization curves before and after polarization.

FIGS. 19a and 19b are graphs illustrating the stability evaluation of 500° C. Pd—Co—Mo/C (Pd:Co:Mo =70:20:10 atom %) cathode upon polarizing the cell at about 200 mA/cm$^2$ for about 80 hours in single cell PEMFC at about 60° C. with a metal(s) loading of about 0.2 mg/cm$^2$: FIG. 19a is a graph illustrating the cell voltage variation during the time of polarization. FIG. 19b is a graph that illustrates the steady-state polarization curves before and after polarization. The current density values are with respect to geometrical area.

In addition to high catalytic activity, the stability of the material in the fuel cell environment is critical for practical applications. A preliminary stability assessment was carried out with the 500° C. Pd—Co—Mo (Pd:Co:Mo=about 70:20:10 atom %) cathode by recording the cell voltage with time and the polarization curves before and after polarizing the fuel cell at a constant current density of about 200 mA/cm$^2$ for about 80 hours (e.g., FIG. 19b). The cell exhibits stable voltage within this test period (see e.g., FIG. 19a) without any difference in the curves before and after polarizing the cell (see e.g., FIG. 19b) while previously reported Pd—Co—Au/C catalyst degraded after about 12 hours of polarization, indicating excellent stability for the Pd—Co—Mo catalyst.

Figure 20:
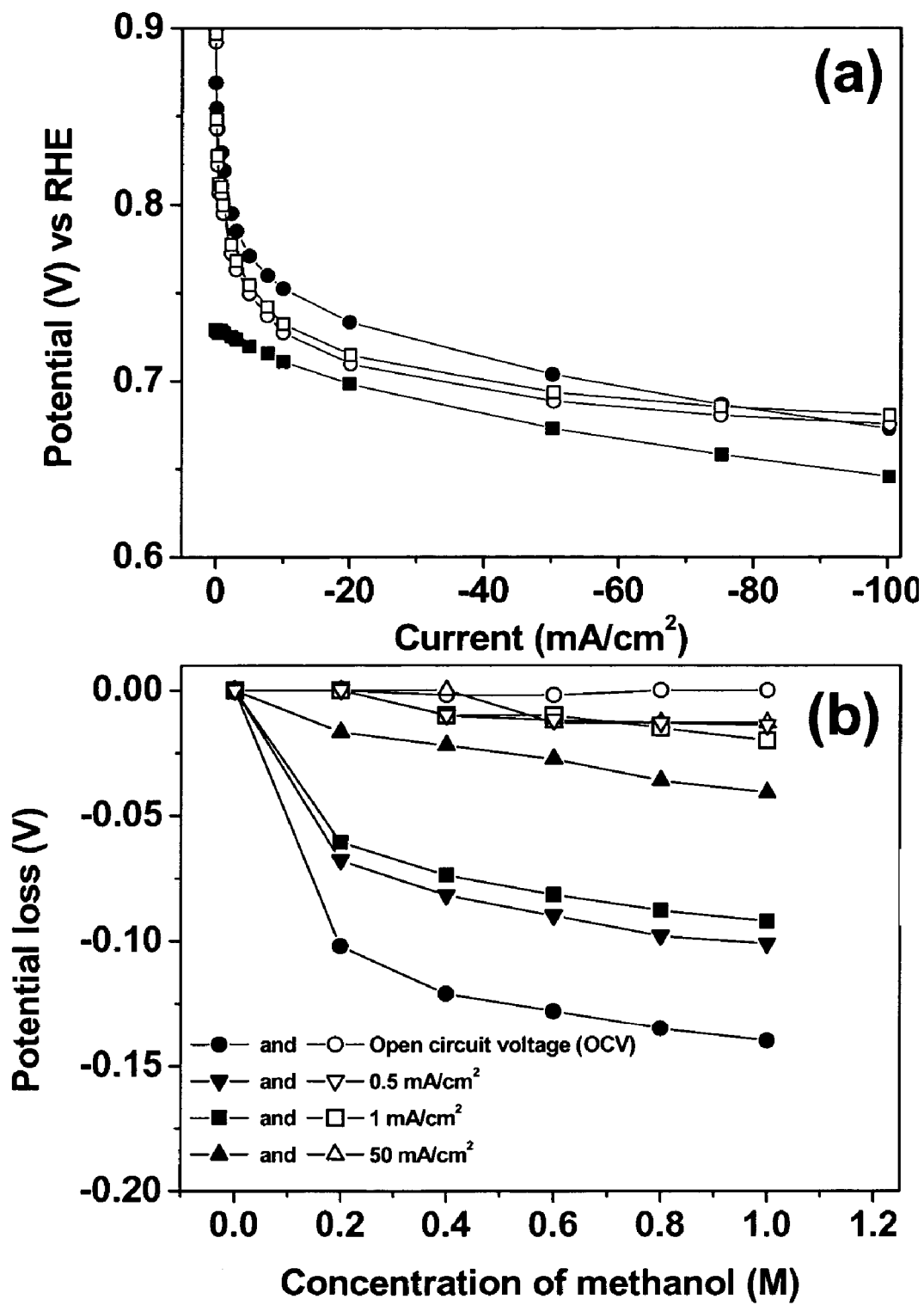
FIGS. 20a and 20b are graphs that compare the polarization curves recorded for ORR.

In direct methanol fuel cells (DMFC), the oxidation of methanol that crosses from the anode to the cathode compartment through the membrane causes a significant poisoning and degradation of the Pt cathode catalyst. Therefore, the tolerance of the cathode catalyst to methanol oxidation in the cathode compartment is an important parameter to achieve good cell performance and operational life in DMFC. Accordingly, to assess the tolerance towards methanol poisoning, the ORR in a half-cell with 1 M sulfuric acid electrolyte in the presence and absence of methanol was observed. FIGS. 20a and 20b are graphs that compare the polarization curves recorded for ORR in the absence and presence of 1 M methanol (FIG. 20a) and potential loss due to methanol poisoning at various methanol concentrations and current densities (FIG. 20b) for the 500° C. Pd—Co—Mo/C (Pd:Co:Mo=about 70:20:10 atom %) and commercial Pt catalysts. While the Pt/C catalyst exhibits a significant potential loss that increases with increasing methanol concentration, the Pd—Co—Mo/C catalyst exhibits quite stable performance with only a small potential loss at high methanol concentrations, indicating remarkable tolerance to methanol poisoning. The potential loss observed for the Pt catalyst is higher at lower current densities (see e.g., FIGS. 20a and 20b), indicating that the -methanol poisoning is significant in the activation overpotential region of the oxygen reduction kinetics.

The Pd—Co—Mo ternary alloy catalyst with an optimum composition of around Pd:Co:Mo=about 70:20:10 exhibits high catalytic activity for ORR in PEMFC with chemical stability and tolerance to methanol poisoning. Its catalytic activity at about 60° C. is better than that of commercial Pt catalyst. The present invention provides a less expensive, more efficient non-platinum catalysts for PEMFC and DMFC, enhancing the commercialization prospects of the fuel cell technology.

The present invention includes an electrocatalyst for an oxygen reduction reaction. The electrocatalyst includes a Group VIII noble metal and two or more metals selected from Groups IIIA, IVA, VIII, IB, IIB, VB, VIB, VIIB and VIIIB of the Periodic Table. In one example, the Group VIII noble metal includes Pd. In another example, the component two or more metals include Co and Mo. The Group VIII noble metal and two or more metals alloy may include the Group VIII noble Pd and the two or more metals are Co and Mo. In another example, the Group VIII noble metal and two or more metals may include Pd, Co and Mo in a Pd:Co:Mo ratio of about 70:20:10. However, the skilled artisan will recognize that the ratio of Pd:Co:Mo of about 70:20:10 may be altered (e.g., between about 60-80: between about 10-30: between about 5-15) to optimize the specific application. Such modifications are well within the expertise of the skilled artisan.

The present invention also provides a membrane-electrode assembly (MEA) for use in a proton exchange membrane fuel cell. The membrane-electrode assembly includes an anode, a cathode and a diffusion layer. The cathode includes one or more catalyst layers having a Group VIII noble metal-M alloy. The component M is one or more metals selected from Groups IIIA, IVA, VIII, IB, IIB, VB, VIB, VIIB and VIIIB of the Periodic Table deposited onto at least a portion of the diffusion layer. In one example, the electrode of the membrane-electrode assembly includes the Group VIII noble metal-M alloy having Pd, Co and Mo in a Pd:Co:Mo ratio of about 70:20:10.

For example, the present invention includes a method of producing an electrocatalytic electrode by applying an electrode substrate with a first solution having a Group VIII noble metal and a second solution having two or more metals selected from Groups IIIA, IVA, VIII, IB, IIB, VB, VIB, VIIB and VIIIB of the Periodic Table. The Group VIII noble metal, the two or more metals of the second solution or both the Group VIII noble metal and the two or more metals of the second solution are, when not an oxide, capable of thermal decomposition to the corresponding oxide. The first solution and the second solution, when other than the oxides, are decomposed thermally to the corresponding oxides or mixed oxides and the first solutions and second solutions are cured at an elevated temperature.

In one example, the Group VIII noble metal includes Pd. In another example, the two or more metals include Co and Mo. The Group VIII noble metal and two or more metals complex may include the Group VIII noble metal Pd and the two or more metals are Co and Mo. In another example, the Group VIII noble metal and two or more metals include Pd, Co and Mo in a Pd:Co:Mo ratio of about 70:20:10. However, the skilled artisan will recognize that the ratio of Pd:Co:Mo ratio of about 70:20:10 may be altered (e.g., between about 60-80:

between about 10-30: between about 5-15) to optimize the specific application. Such modifications are well within the expertise of the skilled artisan.

Furthermore, the present invention provides a method of generating a metallic electrocatalyst candidate array of a variety of electrocatalyst compositions by depositing one or more electrocatalyst spots on a glass carbon substrate, depositing a first solution having one or more Group VIII noble metals to the glass carbon substrate and depositing a second solution comprising two or more metals to the first solution. A fuel cell electrode is also provided. The fuel cell electrode includes an anode in ionic contact with an electrocatalytic cathode. The electrocatalytic cathode includes a Group VIII noble metal-M alloy. The M is two or more metals selected from groups IIIA, IVA, VIII, IB, IIB, VB, VIB, VIIB and VIIIB of the Periodic Table. For example, the Group VIII noble metal-M alloy includes Pd, Co and Mo in a Pd:Co:Mo ratio of about 70:20:10. Although, the Pd:Co:Mo ratio may be between about 60-80: between about 10-30: between about 5-15 to optimize the specific application.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES (1) (a) Hou, Z.; Yi, B.; Zhang, H. Electrochem. Solid State Lett. 2003, 6, A232.
  (b) Wang, C.; Mahesh, W.; Wang, X.; Tang, J. M.; Haddon, R. C.; Yan, Y. Nano Lett.2004, 4, 345.
(2) (a) Zhang, J.; Mo, Y.; Vukmirovic, M. B.; Klie, R.; Sasaki, K.; Adzic, R. R. J. Phys. Chem. B 2004, 108, 10955.
  (b) Van Brussel, M.; Kokkinidis, G.; Hubin, A.; Buess-Herman, C. Electrochim. Acta 2003, 48, 3909.
(3) (a) Paulus, U. A.; Wokaun, A.; Scherer, G. G.; Schmidt, T. J.; Stamenkovic, V.; Radmilovic, V.; Markovic, N. M.; Ross, P. N. J. Phys. Chem. B 2002, 106, 4181.
  (b) Yang, H.; Alonso-Vante, N.; Le'ger, J.-M.; Lamy, C. J. Phys. Chem. B 2004, 108, 1938.
  (c) Mukerjee, S.; Srinivasan, S. J. Electroanal. Chem. 1993, 357, 201. (d) Xiong, L.; Kankan, A. M.; Manthiram, A. Electrochem. Commun. 2002, 4, 898.
(4) (a) Rivera-Noriega, R.; Castillo-Herna'ndez, N.; Soto-Guzman, A. B.; Solorza-Feria, O. Int. J. Hydrogen Energy 2002, 27, 457.
  (b) Ye, S.; Vijh, A. K. Electrochem. Commun. 2003, 5, 272.
(5) (a) Zagal, J.; Pa'ez, M.; Tanaka, A. A.; dos Santos, J. R.; Linkous, C. A. J. Electroanal. Chem. 1992, 339, 13.
  (b) Schulenburg, H.; Stankov, S.; Schunemann, V.; Radnik, J.; Dorbandt, I.; Fiechter, S.; Bogdanoff, P.; Tributsch, H. J. Phys. Chem. B 2003, 107, 9034.
  (c) Sawai, K.; Suzuki, N. J. Electrochem. Soc. 2004, 151, A682 (d) Collman, J. P.; Denisevich, P.; Konai, Y.; Marrocco, M.; Koval, C.; Anson, F. C. J. Am. Chem. Soc. 1980, 102, 6027.
(6) (a) Zen, J.-M.; Manoharan, R.; Goodenough, J. B. J. Appl. Electrochem. 1992, 22, 140.
  (b) Zen, J.-M.; Wang, C.-B. J. Electrochem. Soc. 1994, 141, L51.
(7) Gonza'lez-Cruz, R.; Solorza-Feria, O. J. Solid State Electrochem. 2003, 7, 289.
(8) (a) Calabrese Barton, S.; Kim, H.-H.; Binyamin, G.; Zhang, Y.; Heller, A. J. Phys. Chem. B 2001, 105, 11917.
  (b) Mano, N.; Kim, H.-H.; Zhang, Y.; Heller, A. J. Am. Chem. Soc. 2002, 124, 6480.
  (c) Mano, N.; Ferna'ndez, J. L.; Kim, Y.; Shin, W.; Bard, A. J.; Heller, A. J. Am. Chem. Soc. 2003, 125, 15290.
(9) Adzic', R. In Electrocatalysis; Lipkowski, J., Ross, P. N., Eds.; Wiley-VCH: New York, 1998; Chapter 5, p 197.
(10) Anderson, A. B. Electrochim. Acta 2002, 47, 3759.
(11) Balbuena, P. B.; Altomare, D.; Vadlamani, N.; Bingi, S.; Agapito, L. A.; Seminario, J. M. J. Phys. Chem. A 2004, 108, 6378.
(12) Xu, Y.; Ruban, A. V.; Mavrikakis, M. J. Am. Chem. Soc. 2004, 126, 4717.
(13) Mallouk, T. E.; Smotkin, E. S. In Handbook of Fuel Cells—Fundamental and Applications; Vielstich, W., Lamm; A., Gasteiger, H. A., Eds.; John Wiley & Sons: Hoboken, N. J., 2003; Vol. 2, Part 3, p 334.
(14) Reddington, E.; Sapienza, A.; Gurau, B.; Viswanathan, R.; Sarangapani, S.; Smotkin, E. S.; Mallouk, T. E. Science 1998, 280, 1735.
(15) Gurau, B.; Viswanathan, R.; Lafrenz, T. J.; Liu, R.; Ley, K. L.; Smotkin, E. S.; Reddington, E.; Sapienza, A.; Chan, B. C.; Mallouk, T. E.; Sarangapani, S. J. Phys. Chem. B 1998, 102, 9997.
(16) Liu, R.; Smotkin, E. S. J. Electroanal. Chem. 2002, 535, 49.
(17) Strasser, P.; Fan, Q.; Devenney, M.; Weinberg, W. H.; Liu, P.; NØrskov, J. K. J. Phys. Chem. B 2003, 107, 11013.
(18) Guerin, S.; Hayden, B. E.; Lee, C. E.; Mormiche, C.; Owen, J. R.; Russell, A. E. J. Comb. Chem. 2004, 6, 149.
(19) (a) Jayaraman, S.; Hillier, A. C. J. Comb. Chem. 2004, 6, 27.
  (b) Jambunathan, K.; Jayaraman, S.; Hillier, A. C. Langmuir 2004, 20, 1856.
  (c) Jayaraman, S.; Hillier, A. C. J. Phys. Chem. B 2003, 107, 5221.
  (d) Jambunathan, K.; Hillier, A. C. J. Electrochem. Soc. 2003, 150, E312.
(20) Ferna'ndez, J. L.; Bard, A. J. Anal. Chem. 2003, 75, 2967.
(21) Bard, A. J. In Scanning Electrochemical Microscopy; Bard, A. J., Mirkin, M. V., Eds.; Marcel Dekker: New York, 2001.
(22) Zurilla, R. W.; Sen, R. K.; Yeager, E. B. J. Electrochem. Soc. 1978, 125, 1103.
(23) Bard, A. J.; Faulkner, L. R. Electrochemical Methods; Wiley: New York, 2001; p 499.
(24) Taylor, R. J.; Humffray, A. A. J. Electroanal. Chem. 1975, 64, 85.
(25) Clouser, S. J.; Huang, J. C.; Yeager, E. J. Appl. Electrochem. 1993, 23, 597.

(26) Standard Potentials in Aqueous Solutions; Bard, A. J., Parsons, R., Jordan, J., Eds.; Marcel Dekker: New York, 1985.
(27) Encyclopedia of Electrochemistry of the Elements; Bard, A. J., Ed.; Marcel Dekker: New York, 1973.
(28) Appleby, A. J. J. Electroanal. Chem. 1970, 27, 325.
(29) Sepa, D. B.; Vojnovic, M. V.; Vracar, L. M.; Damjanovic, A. Electrochim. Acta 1987, 32, 129.
(30) Sawyer, D. T.; Day, R. J. Electrochim. Acta 1963, 8, 589.
(31) Binary Alloy Phase Diagrams; Massalski, T., Okamoto, H., Subramanian, P. R., Kacprzak, L., Eds.; ASM International: Ohio, 1990.
(32) Savadogo, O.; Lee, K.; Oishi, K.; Mitsushima, S.; Kamiya, N.; Ota, K.-I. Electrochem. Commun. 2004, 6, 105.
(33) (a) Noronha, F. B.; Schmal, M.; Fre'ty, R.; Bergeret, G.; Moraweck, B. J. Catal. 1999, 186, 20.
  (b) Malla't, T.; Szabo', S.; Petro', J.; Mendioroz, S.; Folgado, M. A. Appl. Catal. 1989, 53, 29.
  (c) Shan, Z. S.; He, P.; Moore, C.; Woollam, J.; Sellmyer, D. J. J. Appl. Phys. 1993, 73, 6057.
  (d) Hubin, M.; Garrault, C.; Gouault, J.; Monnaye, B. Thin Solid Films 1979, 58, 353.
(34) Antoine, O.; Bultel, Y.; Durand, R. J. Electroanal. Chem. 2001, 499, 85.
(35) Santra, A. K.; Goodman, D. W. In Catalysis and Electrocatalysis a Nanoparticle Surfaces; Wieckowski, A., Savinova, E. R., Vayenas, C. G., Eds.; Marcel Dekker: New York, 2003; pp 281-309.
(36) Stonehart, P.; Zucks, P. A. Electrochim. Acta 1972, 17, 2333.
(37) Paulus, U. A.; Wokaun, A.; Scherer, G. G.; Schmidt, T. J.; Stamenkovic, V.; Markovic, N. M.; Ross, P. N. Electrochim. Acta 2002, 47, 3787.
(38) Ferna'ndez, J. L.; Bard, A. J. Anal. Chem. 2004, 76, 2281.
(39) Chan, B. C.; Liu, R.; Jambunathan, K.; Zhang, H.; Chen, G.; Mallouk, T. E.; Smotkin, E. S. J. Electrochem. Soc., in press.
(40) Steele, B. C. H. & Heinzel, A. Materials for fuel-cell technologies. Nature 414, 345-352 (2001).
(41) Berger, D. J. Fuel cells and precious metal-catalysts. Science 286, 49 (1999).
(42) Gasteiger, H. A., Kocha, S. S., Sompalli, B. & Wagner, F. T. Activity benchmarks and requirements for Pt, Pt-alloy, and non-Pt oxygen reduction catalysts for PEMFCs. Appl. Catal. B, 56, 9-35 (2004).
(43) Fernandez, J. L., Walsh, D. & Bard, A. J. Thermodynamic Guidelines for the Design of Bimetallic Catalysts for Oxygen Electroreduction and Rapid Screening by Scanning Electrochemical Microscopy. M-Co (M: Pd, Ag, Au). J. Am. Chem. Soc. 127, 357-365 (2005).
(44) Mukerjee, S., Srinivasan, S., Soriaga, M. P. & McBreen, J. Effect of preparation conditions of Pt alloys on their electronic, structural, and electrocatalytic activities for oxygen reduction—XRD, XAS, and electrochemical studies. J. Phys. Chem. B 99, 4577-4589 (1995).
(45) Joo, S. H.; Choi, S. J.; Oh, M.; Kwak, J.; Liu, Z.; Terasaki, O.; Ryoo, R. Nature, 2001, 412, 169.
(46) Martinez, M. C. R.; Amoros, D. C.; Salano, A. L. ; Martinez, C. S.; Yamashita, H.; Anpo, M. Carbon, 1995, 33, 3.
(47) Raghuveer, V.; Manthiram, A.; Electrochem. Solid-State Letters, 2003, 7, A336.
(48) Watanabe, M.; Tsurumu, T.; Mizukami, T.; Nakamura, T.; Stonehart, P. J. Electrochem. Soc. 1994, 141, 2659.
(49) Mukerjee, S.; Srinivasan, S.; Soriaga, M.; J. Electrochem. Soc. 1995, 142, 1409.
(50) Toda, T.; Igarashi, H. Uchida, H.; Watanabe.; M. J. Electrochem. Soc. 1999, 146, 3750.
(51) Xiong, L.; Manthiram, A.; J. Mater. Chem. 2004, 14, 1454.
(52) Toda, T; Igarashi, H; Watanabe, M. J. Eletroanal. Chem. 1999, 460, 258.
(53) Xiong, L.; Manthiram, A.; J. Electrochem. Soc. 2005, 152, A697.
(54) Rivera-Noriega, R.; Castillo-Hernandez, N.; Soto-Guzman, A. B.; Solorza-Feria, O. Int. J. Hydrogen Energy 2002, 27, 457.
(55) Ye, S.; Vijh, A. K. Electrochem. Commun. 2003, 27, 272.
(56) Pattabhiraman, R. Appl. Catal. A, 1997, 153, 9.
(57) Savadago, O.; Lee, K.; Oishi, K.; Mitsushima, S.; Kamiya, N.; Ota, K.-I. Electrochem. Commun. 2004, 105, 6.
(58) Zen, J.-M.; Manoharan, R.; Goodenough, J. B. J. Appl. Electrochem. 1992, 22, 140.
(59) Zen, J.-M.; Wang, C.-B. J. Electrochem. Soc. 1994, 141, L51.
(60) Raghuveer, V.; Viswanathan, B. J. Mater. Sci. (in press).
(61) Cote, R.; Lalande, G.; Faubert, G.; Guay, D. ; Dodelet, J. P.; Denes, G. J. New Mater. Electrochem. Systems 1998, 1, 7.
(62) Vante, N. A.; Tributsch, H. Nature, 1986, 323, 431.
(63) Trapp, V.; Christensen, P.; Hamnett, A. J. Chem. Soc., Faraday Trans., 1996, 144, 218.
(64) Mano, N.; Fernandez, J. L.; Kim, Y.; Shin, W.; Bard, A. J.; Heller, A. J. Am. Chem. Soc. 2003, 125, 15290.
(65) Mano, N.; Kim, H, -H.; Zhang, Y.; Heller, A. J. Am. Chem. Soc. 2002, 124, 6480.
(66) Sawai, K.; Suzuki, N. J. Electrochem. Soc. 2004, 151, A682.
(67) Collman, J. P.; Deniesevich, P.; Konai, Y.; Marrocco, M.; Koval, C.; Anson.; F. C. J. Am. Chem. Soc. 1980, 102, 6027.
(68) Fernandez, J. L.; Raghuveer, V.; Manthiram, A.; Bard, A. J. J. Am. Chem. Soc. (in press)
(69) Fernandez, J. L.; Walsh, D. A.; Bard, A. J. J. Am. Chem. Soc. 2005, 127, 357.

What is claimed is:

1. An electrocatalyst for an oxygen reduction reaction comprising: Pd, Co and Mo in a Pd:Co:Mo ratio of between about 60 and 80: between about 10 and 30: between about 5-15.

2. The electrocatalyst of claim 1 wherein the Pd:Co:Mo ratio comprising about 70:20:10.

3. A membrane-electrode assembly for use in a proton exchange membrane fuel cell comprising:
  a diffusion layer; and
  an electrode comprising an anode and a cathode, wherein the cathode comprises one or more catalyst layers comprising Pd in intimate contact with Co and Mo to form an alloy in a Pd:Co:Mo ratio of between about 60 and 80: between about 10 and 30: between about 5-15 deposited onto at least a portion of the diffusion layer.

4. The cathode of claim 3, wherein the Pd:Co:Mo ratio comprising about 70:20:10.

5. A method of producing an electrocatalytic electrode comprising the steps of:
  coating a glassy carbon electrode substrate with a first solution comprising Pd;
  coating the glassy carbon electrode substrate with a second solution comprising Co and Mo, to form an electrocatalytic electrode with Pd, Co and Mo are in molar ratio of between about 60 and 80: between about 10 and 30:

between about 5-15, and wherein Pd, Co and Mo are, when not an oxide, capable of thermal decomposition to the corresponding oxide;

decomposing thermally the first solution and the second solution, other than the oxides, to the corresponding oxides or mixed oxides; and curing the first solutions and second solutions at an elevated temperature.

6. The method of claim 5 wherein the Pd:Co:Mo ratio comprising about 70:20:10.

* * * * *

UNITED STATES PATENT AND TRADEMARK OFFICE
CERTIFICATE OF CORRECTION

PATENT NO. : 7,498,286 B2
APPLICATION NO. : 11/274391
DATED : March 3, 2009
INVENTOR(S) : Arumugum Manthiram It is certified that error appears in the above-identified patent and that said Letters Patent is hereby corrected as shown below:

Col. 1, line 63
Replace "70°C. and" with --70°C and--

Col. 5, line 41
Replace "60°C. and" with --60°C and--

Col. 6, line 67
Replace "age verses density" with --age versus density--

Col. 11, line 64
Replace "2 hour, filtered" with --2 hours, filtered--

Col. 11, line 67
Replace "900°C. in a" with --900°C in a--

Col. 12, line 15
Replace "550°C. for about" with --550°C for about--

Col. 12, line 18
Replace "900°C. for about 2 hour" with --900°C for about 2 hours--

Col. 12, line 32
Replace "300°C. for about" with --300°C for about--

Col. 12, line 37
Replace "90°C. for" with --90°C for--

Col. 12, line 42
Replace "130°C. for about" with --130°C for about--

Col. 12, line 54
Replace "60°C. with" with --60°C with--

Col. 20, line 13
Replace "voltage verses the" with --voltage versus the--

UNITED STATES PATENT AND TRADEMARK OFFICE
CERTIFICATE OF CORRECTION

PATENT NO. : 7,498,286 B2
APPLICATION NO. : 11/274391
DATED : March 3, 2009
INVENTOR(S) : Arumugum Manthiram It is certified that error appears in the above-identified patent and that said Letters Patent is hereby corrected as shown below:

Col. 20, line 19
Replace "60°C. with a" with --60°C with a--

Col. 20, line 23
Replace "60°C., and" with --60°C, and--

Col. 20, line 30
Replace "750°C. and the" with --750°C and the--

Col. 20, line 31
Replace "900°C. exhibited" with --900°C exhibited--

Col. 20, line 33
Replace "900°C. Pd" with --900°C Pd--

Col. 20, line 45
Replace "900°C., suggesting" with --900°C, suggesting--

Col. 20, line 47
Replace "550°C. shows" with --550°C shows--

Col. 20, line 52
Replace "900°C., suggesting" with --900°C suggesting--

Col. 20, line 58
Replace "750°C. Pd" with --750°C Pd--

Col. 20, line 59
Replace "900°C. Pd" with --900°C Pd--

Col. 20, line 64
Replace "900°C. sample" with --900°C sample--

Col. 20, line 67
Replace "500°C. sample" with --500°C sample--

UNITED STATES PATENT AND TRADEMARK OFFICE
CERTIFICATE OF CORRECTION

PATENT NO. : 7,498,286 B2
APPLICATION NO. : 11/274391
DATED : March 3, 2009
INVENTOR(S) : Arumugum Manthiram It is certified that error appears in the above-identified patent and that said Letters Patent is hereby corrected as shown below:

Col. 21, Line 1
Replace "750°C. sample" with --750°C sample--

Col. 21, Line 5
Replace "750°C. Pd" with --750°C Pd--
Replace "900°C. Pd" with --900°C Pd--

Col. 21, line 15
Replace "at 500°C.) shows" with --at 500°C)--

Col. 21, line 17
Replace "at 60°C. with a" with --at 60°C with a--

Col. 21, line 20
Replace "60°C., and" with --60°C, and--

Col. 21, line 38
Replace "at 60°C. with a" with --at 60°C with a--

Col. 21, line 41
Replace "60°C., and" with --60°C, and--

Col. 21, line 67
Replace "25°C.:" with --25°C:--
Replace "(b) 750°C." with --(b) 750°C--

Col. 22, Line 1
Replace "(c) 900°C. Pd" with --(c) 900°C Pd--

Col. 24, Line 4
Replace "commercial pt catalyst" with --commercial Pt catalyst--

Col. 24, Line 13
Replace "300°C. for about" with --300°C for about--

UNITED STATES PATENT AND TRADEMARK OFFICE
CERTIFICATE OF CORRECTION

PATENT NO. : 7,498,286 B2
APPLICATION NO. : 11/274391
DATED : March 3, 2009
INVENTOR(S) : Arumugum Manthiram It is certified that error appears in the above-identified patent and that said Letters Patent is hereby corrected as shown below:

Col. 24, line 18
Replace "90°C. for about" with --90°C for about--

Col. 24, line 24
Replace "60°C. with a" with --60°C with a--

Col. 24, line 42
Replace "700°C. treated" with --700°C treated--

Col. 25, line 19
Replace "500°C. for ORR" with --500°C for ORR--

Col. 25, line 20
Replace "60°C. with that" with --60°C with that--

Col. 25, line 32
Replace "60°C. with" with --60°C with--

Col. 25, Line 40
Replace "500°C. Pd" with --500°C Pd--

Col. 25, Line 64
Replace "500°C. Pd" with --500°C Pd--

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,498,286 B2                                                    Page 1 of 1
APPLICATION NO.   : 11/274391
DATED             : March 3, 2009
INVENTOR(S)       : Arumugum Manthiram, Raghuveer Vadari and Allen J. Bard It is certified that error appears in the above-identified patent and that said Letters Patent is hereby corrected as shown below:

Col. 1, line 14
Replace "government may own certain rights in this invention" with --government has certain rights in this invention--

Signed and Sealed this

Twenty-second Day of June, 2010

David J. Kappos
*Director of the United States Patent and Trademark Office*